US011561803B1

(12) United States Patent
Zou et al.

(10) Patent No.: US 11,561,803 B1
(45) Date of Patent: Jan. 24, 2023

(54) SYSTEMS AND METHODS FOR EDITING TOPOLOGY OF A RECONFIGURABLE DATA PROCESSOR

(71) Applicant: SambaNova Systems, Inc., Palo Alto, CA (US)

(72) Inventors: Jibin Zou, Sunnyvale, CA (US); Gregory F. Grohoski, Bee Cave, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 17/371,049

(22) Filed: Jul. 8, 2021

(51) Int. Cl.
G06F 3/0482 (2013.01)
G06F 9/445 (2018.01)
G06F 3/0486 (2013.01)
G06F 3/0485 (2022.01)
G06F 3/04845 (2022.01)

(52) U.S. Cl.
CPC ........ G06F 9/44505 (2013.01); G06F 3/0482 (2013.01); G06F 3/0485 (2013.01); G06F 3/0486 (2013.01); G06F 3/04845 (2013.01)

(58) Field of Classification Search
None
See application file for complete search history.

(56) References Cited

U.S. PATENT DOCUMENTS 5,448,493 A 9/1995 Topolewski et al.
9,183,339 B1 * 11/2015 Shirazi .................. G06F 30/327
9,305,133 B1 4/2016 Ghosh et al.
10,338,782 B2 * 7/2019 Stanfill ..................... G06F 8/34
10,339,243 B2 7/2019 Brissenden et al.
10,606,974 B1 3/2020 Acharya et al.
(Continued)

FOREIGN PATENT DOCUMENTS

WO 2010142987 A1 12/2010

OTHER PUBLICATIONS

Podobas et al, A Survey on Coarse-Grained Reconfigurable Architectures From a Performance Perspective, IEEEAccess, vol. 2020. 3012084, Jul. 27, 2020, 25 pages.
(Continued)

Primary Examiner — Henry Orr
(74) Attorney, Agent, or Firm — Flagship Patents; Sikander Kahn; Bruce Young

(57) ABSTRACT

A system and method for editing a configuration of a graph executable on a set of configurable assets of a reconfigurable data processor is disclosed. The configurable assets can include processing elements having locations on an integrated circuit and links among the processing elements. The system includes logic to read at least portions of a configuration file in memory. The configuration file can include a topology that maps functions of the graph to the plurality of processing elements and links. The system includes logic to display a graphical interface including graphical objects representing functions mapped to corresponding processing elements and links in a selected portion of the topology. The system includes logic to detect user input identifying a graphical object representing a function mapped to a corresponding processing element or link. The system includes logic to change the topology including mapping of corresponding function.

30 Claims, 30 Drawing Sheets

(56) References Cited

U.S. PATENT DOCUMENTS

| | | | | |
|---|---|---|---|---|
| 10,728,121 B1* | 7/2020 | Chitalia | ............... | H04L 41/12 |
| 10,769,346 B1* | 9/2020 | Yu | ............... | G06F 3/0486 |
| 2010/0235847 A1* | 9/2010 | Brehmer | ............... | G06F 9/5066 |
| | | | | 715/764 |
| 2014/0122706 A1* | 5/2014 | Boerner | ............... | G06F 9/5083 |
| | | | | 709/224 |
| 2014/0344210 A1* | 11/2014 | Leigh | ............... | G06F 16/25 |
| | | | | 707/602 |
| 2016/0357424 A1* | 12/2016 | Pang | ............... | H04L 45/66 |
| 2019/0108294 A1* | 4/2019 | Anderson | ............... | G06F 30/34 |
| 2020/0084161 A1* | 3/2020 | Paul | ............... | H04L 47/781 |

OTHER PUBLICATIONS

M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

Prabhakar et al., Plasticine: A Reconfigurable Architecture for Parallel Patterns, ISCA 2017, Jun. 24-28, 2017, Toronto, ON, Canada, 14 pages.

* cited by examiner

Example of a Configuration File 2510

Configurations:

Connection: from PCU A to PMU A by data traffic go vertically 2520

Connection: from PCU B to PMU B by data traffic go horizontally 2525

Unit: PCU A at Row D Column B
Unit: PCU B at Row C Column A
Unit: PMU A at Row A Column C
Unit: PMU B at Row C Column E

Example of Changes in Configuration File

Before Optimization 2510

Configurations:

Connection: from PCU A to PMU A by data traffic go vertically

Connection: from PCU B to PMU B by data traffic go horizontally

Unit: PCU A at Row D Column B

Unit: PCU B at Row C Column A

Unit: PMU A at Row A Column C

Unit: PMU B at Row C Column E

After Optimizatoin 2660

Configurations:

Connection: from PCU A to PMU A by data traffic go vertically

Connection: from PCU B to PMU B by data traffic go vertically ← "changed" 2670

Unit: PCU A at Row D Column B

Unit: PCU B at Row A Column D ← "changed" 2675

Unit: PMU A at Row A Column C

Unit: PMU B at Row C Column E

FIG. 26B

SYSTEMS AND METHODS FOR EDITING TOPOLOGY OF A RECONFIGURABLE DATA PROCESSOR

BACKGROUND

Technological Field

The present technology relates to configuration of reconfigurable architectures, can be particularly applied to configuration of coarse-grain reconfigurable architectures.

Description of Related Art

Reconfigurable processors, including field programmable gate arrays FPGAs, can be configured to implement a variety of functions more efficiently or faster than might be achieved using a general purpose processor executing a computer program. So called coarse-grain reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Configuration of reconfigurable processors involves compilation of a configuration description to produce a configuration file, referred to sometimes as a bitstream or bit file, and distributing the configuration file to the configurable units on the processor. To start a process, the configuration file must be loaded for that process. To change a process, the configuration file must be replaced with the new configuration file.

The procedures for determining performance and errors in a topology of components represented by a configuration file can be complex, and the execution of the procedures can be time consuming. The outputs from these procedures can be used for making changes to the topology to remove errors and improve performance. A new updated configuration file has to be loaded to reflect changes in the topology. This process of evaluating a topology can be time consuming and increases time and effort during design and development of such systems.

Therefore, an opportunity arises to provide tools for hardware and software development by presenting performance results of a given topology to users and enabling users to make on the fly changes to the topology using these performance results.

SUMMARY

A system, and method for operating a system, are provided for editing a configuration of a graph executable on a set of configurable assets of a reconfigurable data processor. The configurable assets can include a plurality of processing elements having locations on an integrated circuit or integrated circuits and links among the plurality of processing elements.

The reconfigurable data processor (e.g., CGRA) comprises hardware assets (such as components, processing elements, or units). The hardware assets can have physical locations in a reconfigurable data processor being used or being modeled. The reconfigurable data processor (such as the CGRA) can have a fixed set of hardware assets arranged in tiles. For example, each chip can have four tiles. There may be many chips in the reconfigurable data processor. The communication networks linking the assets are also hardware assets. These hardware assets including the links among the hardware assets can have configurations that are specified in a configuration file. An initial configuration can be generated by a compiler. A configuration file can define a topology of a graph to be executed. The configuration file can also define the functions mapped to hardware assets.

A topology for the reconfigurable data processor can be defined as the relative positions of the hardware assets and links among those assets to implement the functions. A topology can represent mapping of the functions to hardware assets or placement of the functions at the hardware assets. An initial topology can be represented by a configuration generated by a compiler. The technology disclosed provides tools to optimize the topology by editing or modifying the topology by rearranging the mapping of functions and links within the available set of hardware assets.

The topology can be displayed on a graphical user interface (GUI). The GUI presents graphical objects (or graphical constructs, or graphical representations). The graphical objects can represent configuration of processing elements. The graphical object can represent mapping of functions to underlying hardware assets or processing elements to which the topology is deployed. The graphical objects can also represent GUI elements such as buttons, menus, pull down menus, widgets, etc. that prompt for input to select a procedure.

Movement of a graphical object by a gesture on the GUI can be interpreted by the system as a change in the allocation of a function to a hardware asset and a need to recompute the links between the functions. The technology disclosed provides a tool (such as an integrated development environment or IDE) to display graphical objects in a manner that represents physical arrangement of the assets used to implement functions of the graph.

The technology disclosed includes logic to present graphical objects representing hardware assets of a reconfigurable data processor on a display (or GUI). The system can receive inputs for the graphical representations via input devices such as a pointer, mouse, keyboard, etc. The graphical display or graphical interface can display graphical objects representing a mapping of functions to processing elements or units. The hardware asset or hardware unit refers to the processing element that is configured. The technology disclosed can use graphical objects to select parts of the configuration file and launch procedures or functions to edit or change the mapping of functions to processing elements. The configuration file can represent a topology of processing elements. Therefore, the system allows edits or changes to a topology by using the graphical user interface.

The system includes logic to receive results from the hardware (such as a test board) to highlight or update the graphical objects on graphical interface. The system can also receive results from simulation to highlight or update the graphical objects on graphical interface.

Gestures on GUI can involve moving a graphical object to invoke a procedure, or selecting a graphical object in connection with some procedure such as a procedure on a pull down menu, or grouping two or more graphical objects, moving (or drag and drop) a single or a group of graphical objects from an initial (or source) location on the GUI to a destination location, etc. The graphical objects can represent configuration of one or more processing elements having a position in the hardware being allocated that corresponds to the location of the object on the GUI. Therefore, when the graphical object is moved on the GUI, the configuration of the processing element is changed, and the configuration file is updated accordingly.

The technology disclosed includes logic to allow changes to graphical objects such as moving a graphical representation of a configuration of a processing element from one location to another. The system includes logic to interpret gestures related to graphical objects to access the configuration of the processing element or unit represented by the graphical object and apply changes. For example, the system can interpret moving a graphical object on the graphical display to change the mapping of functions from one processing element or link to another processing element or link. The system can also make consequential changes to configuration of other elements or links based on changes to a processing element represented by a graphical object which is target of the gesture on the graphical display.

The system can comprise a processor including a display and memory accessible by the processor. The memory can include instructions executable to perform the following operations. The system includes logic to read at least portions of a configuration file in memory. The configuration file can include a topology that places functions of the graph at processing elements and links having relative positions among the plurality of processing elements and links. The system includes logic to display a graphical interface including graphical objects representing functions placed at corresponding processing elements and links arranged according to relative positions in a selected portion of the topology. The system includes logic to detect user input identifying a graphical object in the graphical representation representing a function placed at a corresponding processing element or link. The system includes logic to launch a procedure to change the placement of the corresponding function in the topology. The system includes logic to launch the procedure to update the configuration file to implement the change to the topology to provide an updated topology. The system includes logic to update the graphical representation based on the updated topology including updated placement of functions to processing elements in the graph that comprises functions.

The plurality of processing elements of the reconfigurable data processor can include compute and memory units.

In one embodiment, the system can include logic to receive data indicating data traffic on the links from simulation or execution of the graph. The system can include logic to generate graphical objects for display with the selected portion of the topology which represent a characteristic of the data traffic.

In one embodiment, the system can include logic to generate hardware error information to indicate hardware failure. The hardware error information can indicate error in at least one processing element or link in the selected portion of the topology.

In one embodiment, the system can include logic to generate a data hang notice for the topology to indicate at least one nonresponsive processing element in the plurality of processing elements of the reconfigurable data processor.

The user input in the graphical representation can include a drag and drop gesture of at least one graphical object representing a function placed at a corresponding processing element or link from the corresponding processing element or link to a location on the graphical representation corresponding to another processing element or link.

The user input in the graphical representation can include a grouping gesture of two or more graphical objects representing a function placed at corresponding processing elements in the plurality of processing elements to assign the processing elements to a group and update the graphical representation indicating grouping of graphical objects.

In one embodiment, the system can include logic to receive an input including an identifier or a name of a processing element. The system can include a procedure to search the topology using the input identifier or the input name. The system can include logic to identify a matched processing element. The system can include logic to zoom in to display a graphical object representing the matched processing element on the display.

In one embodiment, the system can include logic to receive an input including an identifier or a name of a link (or an interconnection route). The system can include a procedure to search the topology using the input identifier or the input name. The system can include logic to identify a matched link. The system can include logic to zoom in to display a graphical object representing the matched link on the display.

In one embodiment, the system can include logic to display a list of operations for a graphical object on the display. The operations in the list of operations can be related to a processing element in the plurality of processing elements represented by the graphical object in the graphical representation. The operations can include displaying processing element information, highlighting the graphical object representing the processing element, or editing a processing element's property.

In one embodiment, the system can include logic to display a list of operations for a graphical object on the display. The operations in the list of operations can be related to a link or an interconnection route between two processing elements represented by the graphical object in the graphical representation. The operations can include anyone of displaying the link or the interconnection route information, highlighting the graphical object representing the link or the interconnection route, or editing the link property.

In one embodiment, the user input identifying the graphical object can include selecting the graphical object representing the function mapped to the corresponding processing element from a location of corresponding processing element and dragging the selected graphical object to a destination location on the graphical representation corresponding to another processing element. The system includes logic to animate movement of the selected graphical object to the destination location. The system can include logic to re-route the links to the graphical object corresponding to processing element at the destination location. The system can include logic to display the re-routed links to graphical object corresponding to the processing element at the destination location.

In one embodiment, the system can include logic to select the graphical object representing the group of graphical objects corresponding to processing elements in the group and dragging the selected graphical object from a location of corresponding processing elements in the group to a destination location on the graphical representation corresponding to another group of processing elements. The system can include logic to animate movement of the graphical object representing the group to the destination location. The system can include logic to re-route the links or the interconnection routes to processing elements in the group of processing elements at the destination location. The system can include logic to display the graphical representations of updated links to the graphical objects representing the group at the destination location.

In one embodiment, the system can include logic to detect user input for a graphical object representing a link or interconnection route between two processing elements in the plurality of processing elements. The input can include dragging a graphical object representing the link to a destination location on the graphical representation corresponding to a re-routed link between the two processing elements in the plurality of processing elements. The system includes logic to animate re-routing of the link to the destination location. The system can include logic to display the updated graphical object corresponding to the re-routed link at the destination location.

Functions described herein, including but not limited to reading portions of a configuration file including a topology that places functions at processing elements and links having relative positions among a plurality of processing elements and links; detecting user input and launching procedures to update the configuration file to provide an updated topology present complex problems of computer engineering relating to for example, what changes are needed in configuration file to reflect movements of graphical objects on the user interface to optimize the topology of a reconfigurable data processor, what changes are needed in placement of functions on processing elements; and how to re-route links connecting the processing elements to update the topology.

Methods and computer program products which can be executed by computer systems are also described herein.

Other aspects and advantages of the technology described herein can be seen on review of the drawings, the detailed description and the claims, which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

FIG. 25A presents an example of a configuration file with an initial topology for loading to the system for editing the topology of reconfigurable data processors.

FIG. 26B shows changes in the initial configuration file of FIG. 25A as a result of optimizations to the topology as shown in FIG. 26A.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
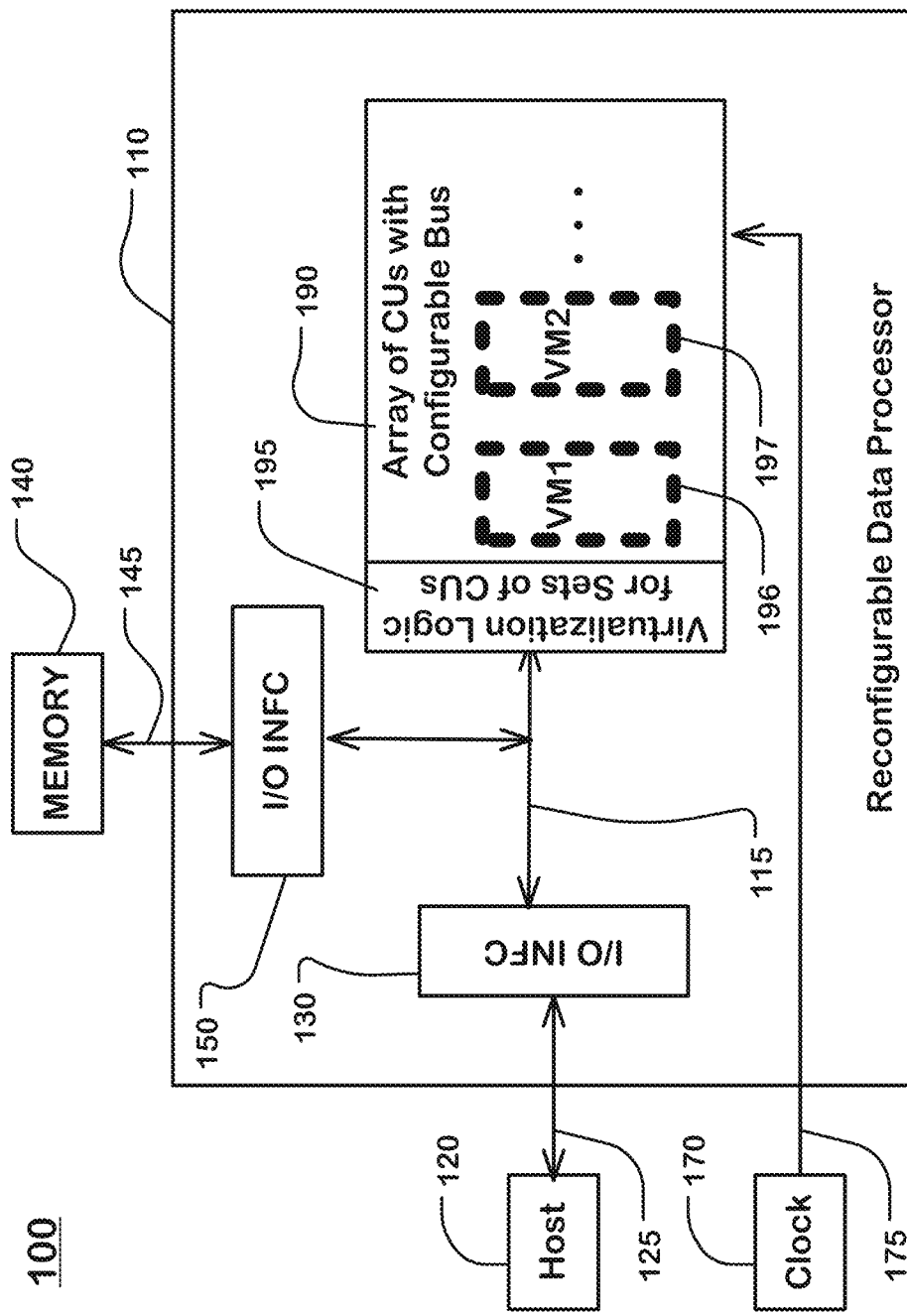
FIG. 1 is a system diagram illustrating a system including a host, a memory, and a reconfigurable data processor.

FIG. 1 is a system diagram illustrating a system including a host 120, a memory 140, and a reconfigurable data processor 110. As shown in the example of FIG. 1, the reconfigurable data processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources, or may be implemented using shared logic and data path resources as suits a particular embodiment. In some embodiments, a system may include only a configuration load controller of the types described herein. In some embodiments, a system may include only a configuration unload controller of the types described herein.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width of carrying one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

The reconfigurable data processor (e.g., CGRA) comprises hardware assets (such as components, or processing elements, or units). The hardware assets can have physical locations in the reconfigurable data processor or reconfigurable data processors being used or being modeled. The reconfigurable data processor (such as the CGRA) can have a fixed set of hardware assets arranged in tiles. For example, each chip can have four tiles. There may be many chips in a reconfigurable data processor. The communication networks linking the assets can also be hardware assets. These hardware assets including the links among the hardware assets can have configurations specified in a configuration file. We present further details of hardware assets or processing elements with reference to FIG. 3.

An external clock generator 170 or other clock signal sources can provide a clock signal 175 or clock signals to elements in the reconfigurable data processor 110, including the array 190 of configurable units, and the bus system 115, and the external data I/O interfaces.

The technology disclosed provides a system including an interactive display (such as an integrated development environment or IDE) to support hardware and software development. Such hardware and software can be used for artificial intelligence (or AI) applications. The system provides an interactive interface to visualize and manipulate configurable hardware assets or processing elements of the reconfigurable processor (e.g., CGRA) architecture for the AI applications. The technology disclosed provides tools for editing the configuration of a graph executable on a set of configurable assets of a reconfigurable data processor. The configurable assets can include a plurality of processing elements having locations on an integrated circuit or integrated circuits and links among the plurality of processing elements.

The reconfigurable hardware assets can have physical locations in the reconfigurable data processor or reconfigurable data processors being used or being modeled. The reconfigurable data processor (such as the CGRA) can have a fixed set of hardware assets arranged in tiles.

A topology for the reconfigurable data processor can be defined in a configuration file. The topology places functions of a graph executable on a set of configurable assets of a reconfigurable data processor. A topology can represent mapping of the functions to hardware assets. The technology disclosed provides tools to edit or modify the topology for optimization by rearranging the placement of functions on the hardware assets that can include processing elements and links. The processing elements and links have relative positions among the plurality of processing elements and links within the available set of hardware assets. A configuration file can define a topology of a graph to be executed. The configuration file can also define the functions. The technology disclosed can identify and provide visualizations of performance issues in a topology. The technology disclosed includes logic to edit the topology to improve the performance of the reconfigurable data processor and remove hardware and software issues.

The topology can be displayed on a graphical user interface (GUI). The GUI presents graphical objects (or graphical constructs, or graphical representations). For example, a graphical object can represent the configuration of a processing element. The graphical object can represent the underlying hardware processing elements to which the topology is deployed. The graphical object can also represent GUI elements such as buttons, menus, pull down menus, widgets, etc. that prompt for input to select a procedure. The technology disclosed provides APIs (Application Programming Interfaces) to receive inputs for GUI objects and provide the results via the graphical user interface or other means such as file outputs, etc.

The topology can be represented by the graphical display or GUI. Therefore, moving a graphical object by a gesture on the GUI is interpreted by the system as a change in the allocation of a function to a hardware asset and a need to recompute the links between the functions. The system can launch a procedure to update the configuration file to implement the change in the topology and provide an updated topology. The updated topology includes updated placement of functions to processing elements in the graph that comprises functions. The technology disclosed provides a tool (integrated development environment or IDE) to display graphical objects in a manner that represents physical arrangement of the assets used to implement functions of the graph.

The system can provide performance profiling, power analysis, simulation, scan dump analysis or other analysis for the CGRA architecture for a given topology. Such kind of analysis are useful for designers and engineers when developing and debugging hardware and software for AI applications. The technology disclosed provides a convenient, intuitive, and flexible end-to-end tool for AI chip design, development and debugging.

The reconfigurable data processor can include links or interconnection routes between a plurality of processing elements (or hardware units or components). The topology can define flow of data between processing elements of the reconfigurable data processor using the links or interconnection routes. The system can include a processor, a graphical display and a memory accessible by the processor. The system includes logic to read at least a portion of the configuration file to memory. The configuration file can define a topology that places functions of a graph on the plurality of processing elements and links. When the configuration file or a portion of the configuration file is loaded into memory, the system can display a graphical interface including graphical objects representing functions mapped to corresponding processing elements and links in a selected portion of the topology.

The technology disclosed includes logic to present graphical objects representing hardware assets of a reconfigurable data processor on a display (or GUI). The system can receive inputs for the graphical representations via input devices such as a pointer, mouse, keyboard, etc. The graphical display or graphical interface can display graphical objects representing a mapping of functions to hardware assets including processing elements and links. The hardware asset refers to the processing elements or links that are configured. The technology disclosed can use graphical objects to select parts of the configuration file and launch procedures or functions to edit or change placement of functions at processing elements or links. The system includes logic to receive results from the hardware (such as a test board) to highlight or update the graphical objects on graphical interface. The system can also receive results from simulation to highlight or update the graphical objects on graphical interface. The results or errors received from hardware or simulation can be used to edit the topology for optimization. The updates can be performed by selecting and moving processing elements or links resulting in the system to launch procedures to update the configuration file. The system then updates the graphical representation to implement the change to the topology using the updated configuration file.

The GUI objects can provide visualization of processing elements including components of the CGRA, the CGRA coordinates, chip tile information, component ports, component names, physical relationships and connection relationships among the components. Thus, the system can provide an intuitive view of the full chip and the graph illustrating connections between the components. Examples of CGRA components that can be visualized as GUI objects include Pattern Memory Units (PMUs), Pattern Compute Units (PCUs), switches, Address Generation and Coalescing Units (AGCUs), controls, data connections, etc. The routing lanes for connections can be represented as horizontal and vertical lanes (or links) in GUI interface. The system can use predefined algorithms to determine routing lanes to show a picture of how the components are connected to each other in the topology.

Gestures on the GUI can involve moving a graphical object to invoke a procedure, or selecting a graphical object in connection with some procedure such as a procedure on a pull down menu, or grouping two or more processing elements, moving (or drag and drop) a single processing element or a group of processing elements from an initial (or source) location on the GUI to a destination location, etc. The graphical objects can represent configuration of a processing element having a position in the hardware being allocated that corresponds to the location of the object on the GUI. Therefore, when the graphical object is moved from a source to a destination location on the GUI, the mapping of functions to corresponding processing elements is changed and the system updates the configuration file accordingly. The users can interact with the GUI objects displayed on the display of the system using input devices such as a mouse, keyboard, etc. The system can display information about the processing elements represented by GUI objects selected or pointed to by the user.

The technology disclosed includes logic to allow changes to graphical objects such as moving a graphical representation of a configuration of a processing element from one location to another. The system includes logic to interpret gestures related to graphical objects to access the configuration of the element or unit represented by the graphical object and apply changes. For example, the system can interpret moving a graphical object on the graphical display to change the mapping of functions from one processing element or link to another processing element or link. The system can also make consequential changes to configuration of other elements or links based on changes to the element represented by the graphical object which is target of the gesture on the graphical display. The system provides functions for hardware and software design and development including graph visualization, and performance of components. We first present further details of components of a reconfigurable processor such as a CGRA (Coarse Grain Reconfigurable Architecture) processor in FIGS. 2 to 4. Following this, we present details of the system for editing a topology of the reconfigurable data processor in FIGS. 5 to 26B.

Figure 2:
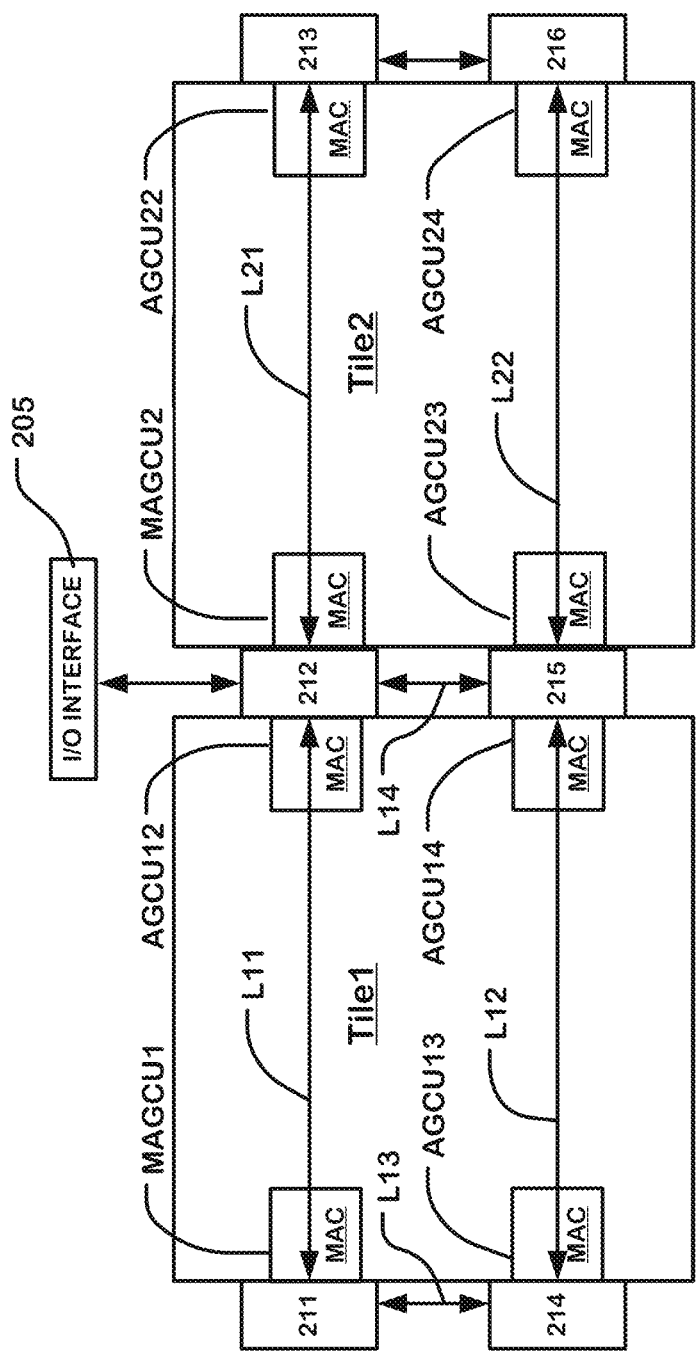
FIG. 2 is a simplified block diagram of a top-level network and components of a CGRA (Coarse Grain Reconfigurable Architecture).

FIG. 2 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including an array level networks in this example. The bus system includes a top-level network connecting the tiles to external I/O interface 205 (or any number of interfaces). In other embodiments, different bus system configurations may be utilized. The configurable units in each tile are nodes on the array level network in this embodiment.

Each of the two tiles has 4 AGCUs (Address Generation and Coalescing Units) (e.g., MAGCU1, AGCU12, AGCU13, AGCU14). The AGCUs are nodes on the top-level network and nodes on the array-level networks, and include resources for routing data among nodes on the top-level network and nodes on the array-level network in each tile.

Nodes on the top-level network in this example include one or more external I/O, including interface 205. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top level switches (211-216) connecting to each other as well as to other nodes on the top-level network, including the AGCUs, and I/O interface 205. The top-level network includes links (e.g. L11, L12, L21, L22) connecting the top level switches. Data travels in packets between the top-level switches on the links, and from the switches to the nodes on the network connected to the switches. For example, top-level switches 211 and 212 are connected by a link L11, top-level switches 214 and 215 are connected by a link L12, top-level switches 211 and 214 are connected by a link L13, and top-level switches 212 and 213 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 211, 212, 214 and 215 are connected to MAGCU1, AGCU12, AGCU13 and AGCU14 in the tile Tile1, respectively. Top-level switches 212, 213, 215 and 216 are connected to MAGCU2, AGCU22, AGCU23 and AGCU24 in the tile Tile2, respectively.

Top-level switches can be connected to one or more external I/O interfaces (e.g. interface 205).

Figure 3A:
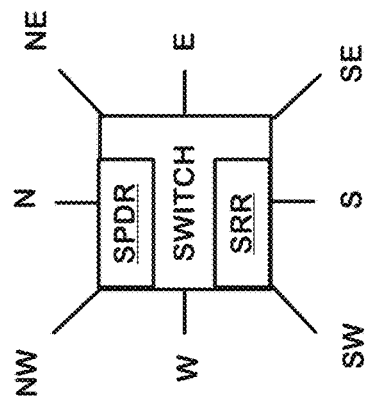
FIG. 3A illustrates an example switch unit connecting elements in an array level network.
Figure 3:
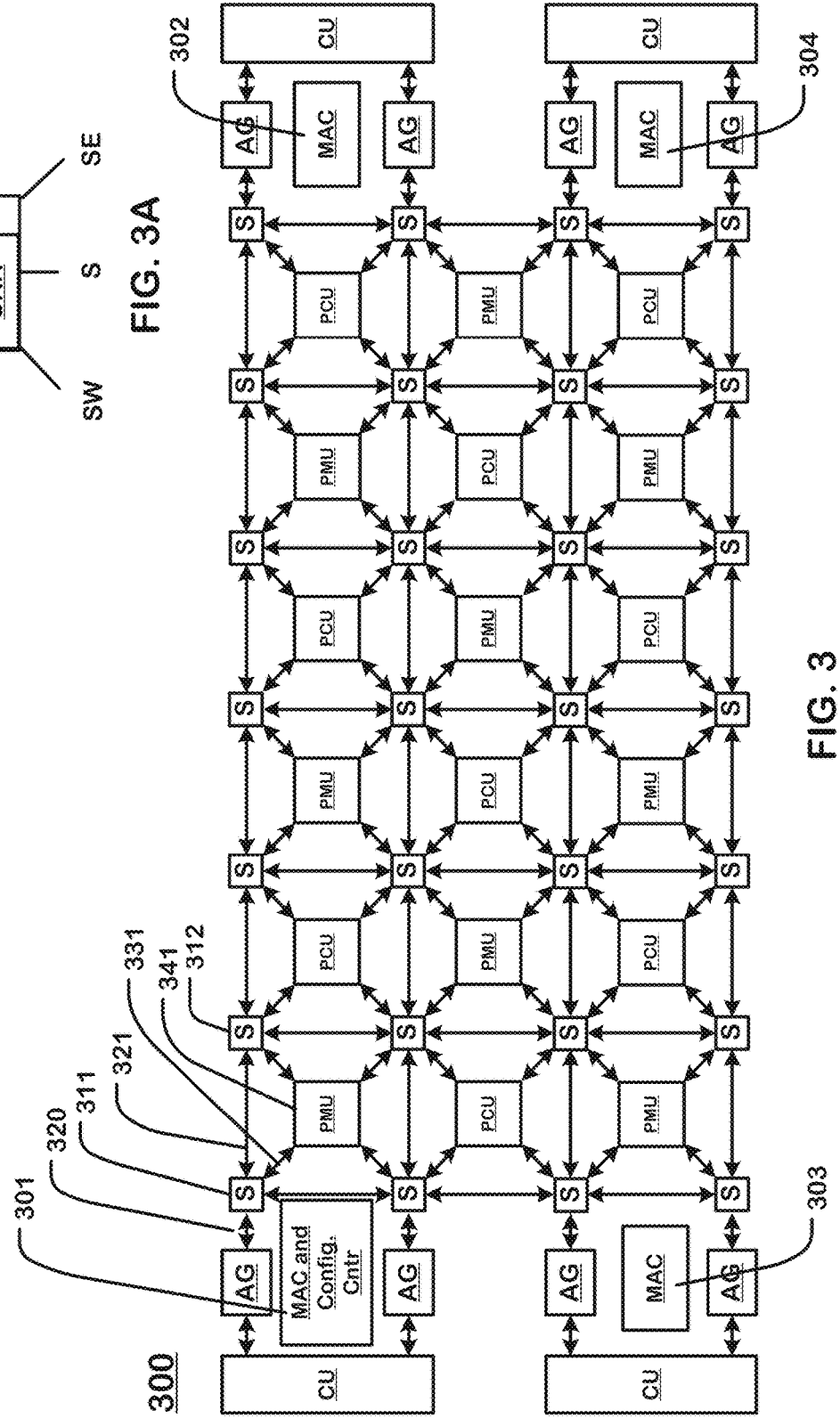
FIG. 3 is a simplified diagram of a tile and an array level network usable in the configuration of FIG. 2, where the configurable units in the array are nodes on the array level network.

FIG. 3 is a simplified diagram of a tile and an array-level network usable in the configuration of FIG. 2, where the configurable units in the array are nodes on the array level network.

In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The array-level network includes links interconnecting configurable units in the array. The links in the array-level network include one or more and, in this case three, kinds of physical buses: a chunk-level vector bus (e.g. 128 bits of data), a word-level scalar bus (e.g. 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
    Bits that form a chunk number.
    Bits that indicate a column identifier.
    Bits that indicate a row identifier.
    Bits that indicate a component identifier.

For a load operation, the configuration load controller can send the number N of chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 3A illustrates an example switch unit connecting elements in an array level network. As shown in the example of FIG. 3A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

Figure 4:
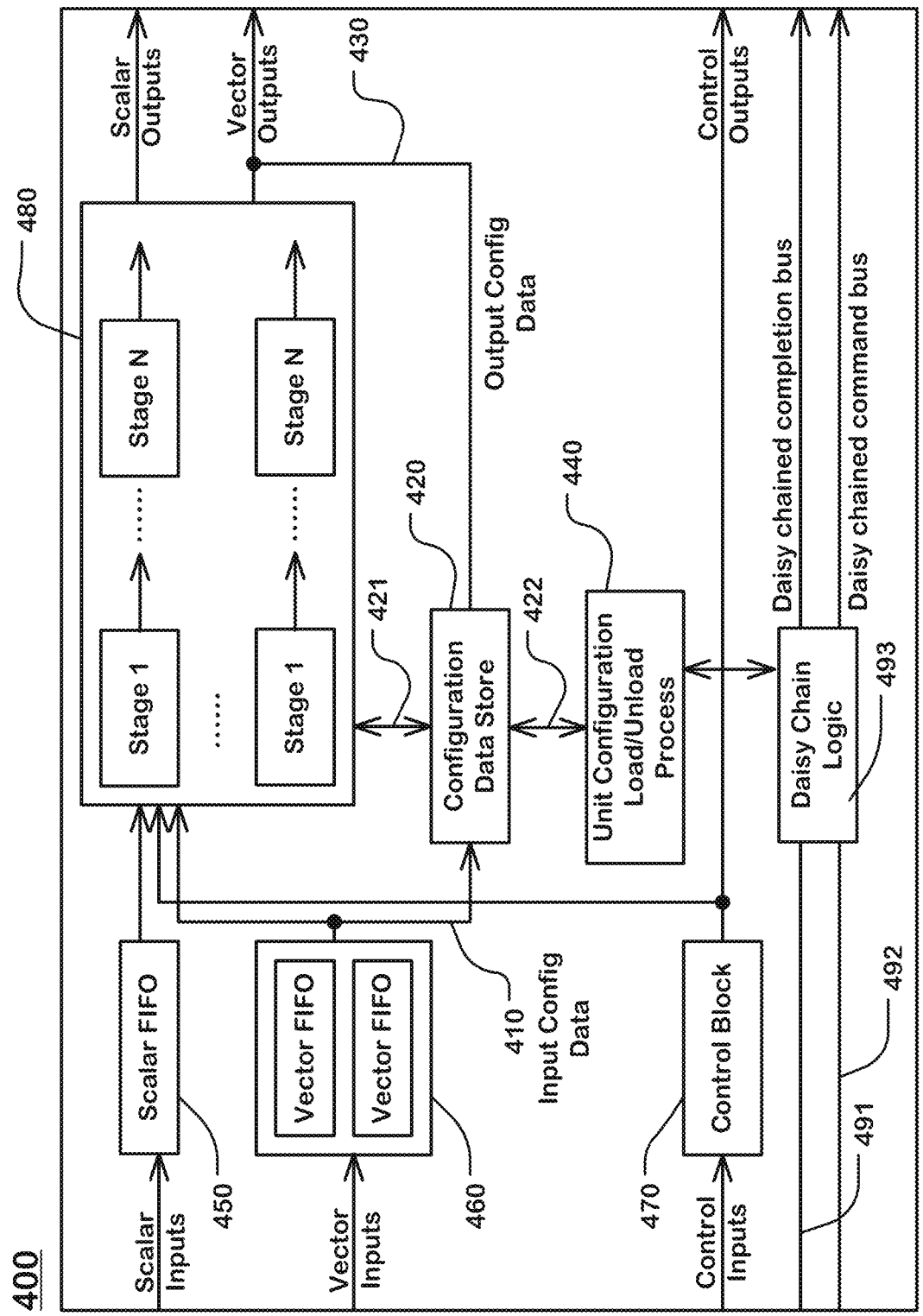
FIG. 4 is a block diagram illustrating an example configurable unit.

In this example, one of the AGCUs is configured to be a master AGCU, which includes a configuration load/unload controller (e.g., 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions, and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a block diagram illustrating an example configurable unit 400, such as a Pattern Compute Unit (PCU). Configurable units in the array of configurable units include configuration data stores 420 (e.g., serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving via the bus system (e.g., the vector inputs), chunks of a unit file particular to the configurable unit, and loading the received chunks into the configuration data store 420 of the configurable unit.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

A configurable unit can interface with the scalar, vector, and control buses using three corresponding sets of inputs and outputs (IO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process, and transmitting and receiving data during operation after configuration across a long pipeline between multiple PCUs. Control IOs can be used to communicate control signals such as the start or end of execution of a configurable unit. Control inputs are received by control block 470, and control outputs are provided by the control block 470.

Each vector input is buffered using a vector FIFO in a vector FIFO block 460 which can include one or more vector FIFOs. Each scalar input is buffered using a scalar FIFO 450. Using input FIFOs decouples timing between data producers and consumers, and simplifies inter-configurable-unit control logic by making it robust to input delay mismatches.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy chained completion bus to indicate when a load/unload command has been completed. The master AGCU transmits the program load and unload commands to configurable units in the array of configurable units over a daisy-chained command bus. As shown in the example of FIG. 4, a daisy chained completion bus 491 and a daisy chained command bus 492 are connected to daisy chain logic 493, which communicates with the unit configuration load logic 440. The daisy chain logic 493 can include load complete status logic, as described below. The daisy chained completion bus is further described below. Other topologies for the command and completion buses are clearly possible but not described here.

A configurable unit includes multiple reconfigurable data paths in block 480. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via lines 421.

A Pattern Memory Unit (e.g., PMU) can contain scratchpad memory coupled with a reconfigurable scalar datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU. We now present details of the system for editing topology of a reconfigurable data processor. We first present components or units of reconfigurable data processor as used in the technology disclosed. Following this, we present details of the graphical user interface and APIs to edit topology represented by a configuration file.

Figure 5:
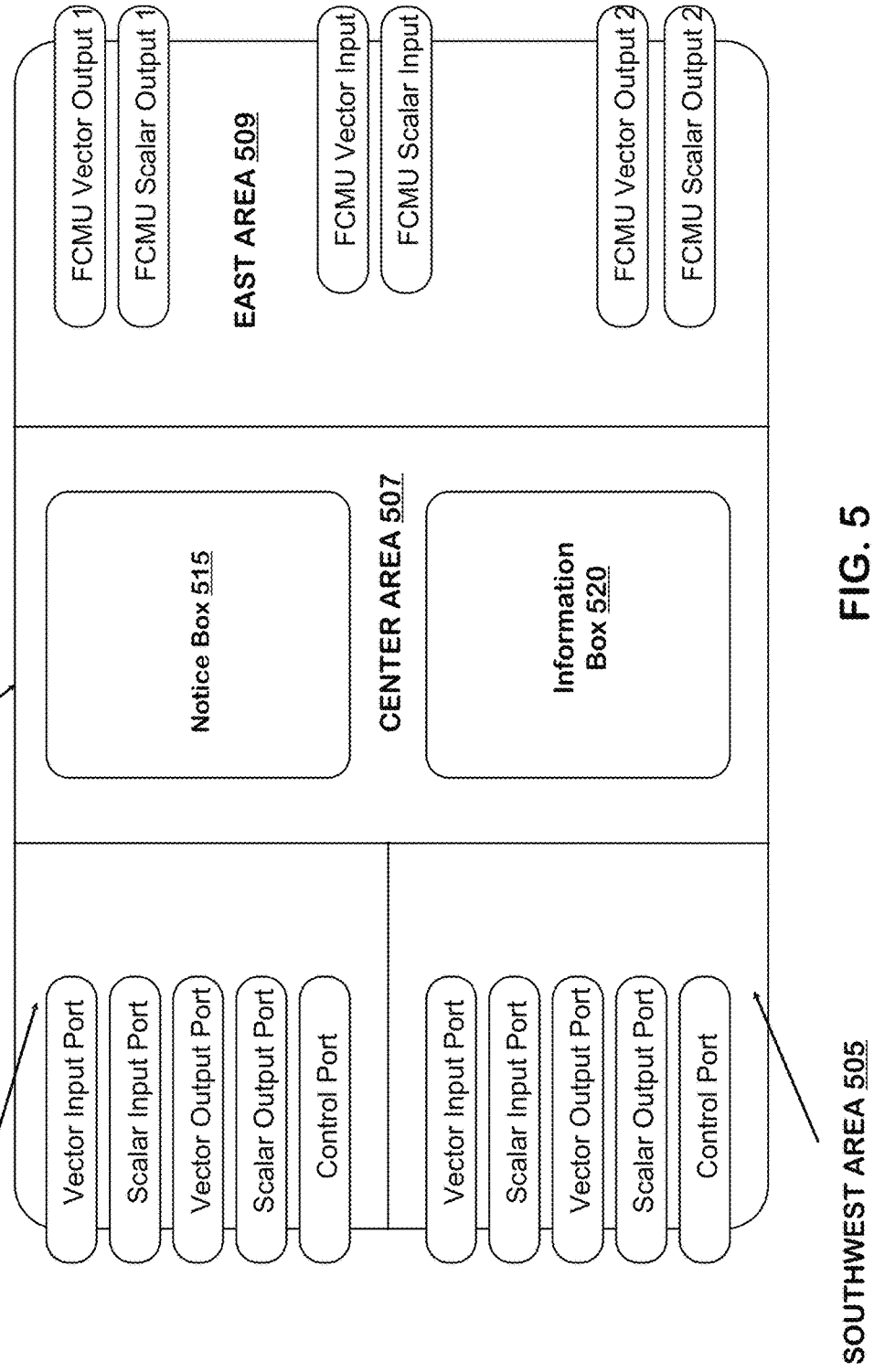
FIG. 5 is an example memory unit GUI object as used in the system for editing topology of a reconfigurable data processor.

FIG. 5 presents an example PMU GUI object 501 that represents a function mapped to a PMU in the configuration file for a reconfigurable data processor. There are four main areas or regions in the PMU GUI object. The northwest area 503 and southwest area 505 include input and output ports, the center area 507 includes a notice box 515 and an information box 520. An east area 509 includes input and output connections to a graphical object representing a Pattern Compute Unit (PCU) not shown in FIG. 5. The notice box 515 and information box 520 are used to provide messages or results to the users from simulation of the topology. The system includes logic to provide information indicating data traffic congestion or hardware errors to indicate failure of one or more processing elements or components of the reconfigurable processor. The system can also provide information about data hang notice for the topology to indicate at least one nonresponsive processing element or component of the reconfigurable processor.

Figure 6:
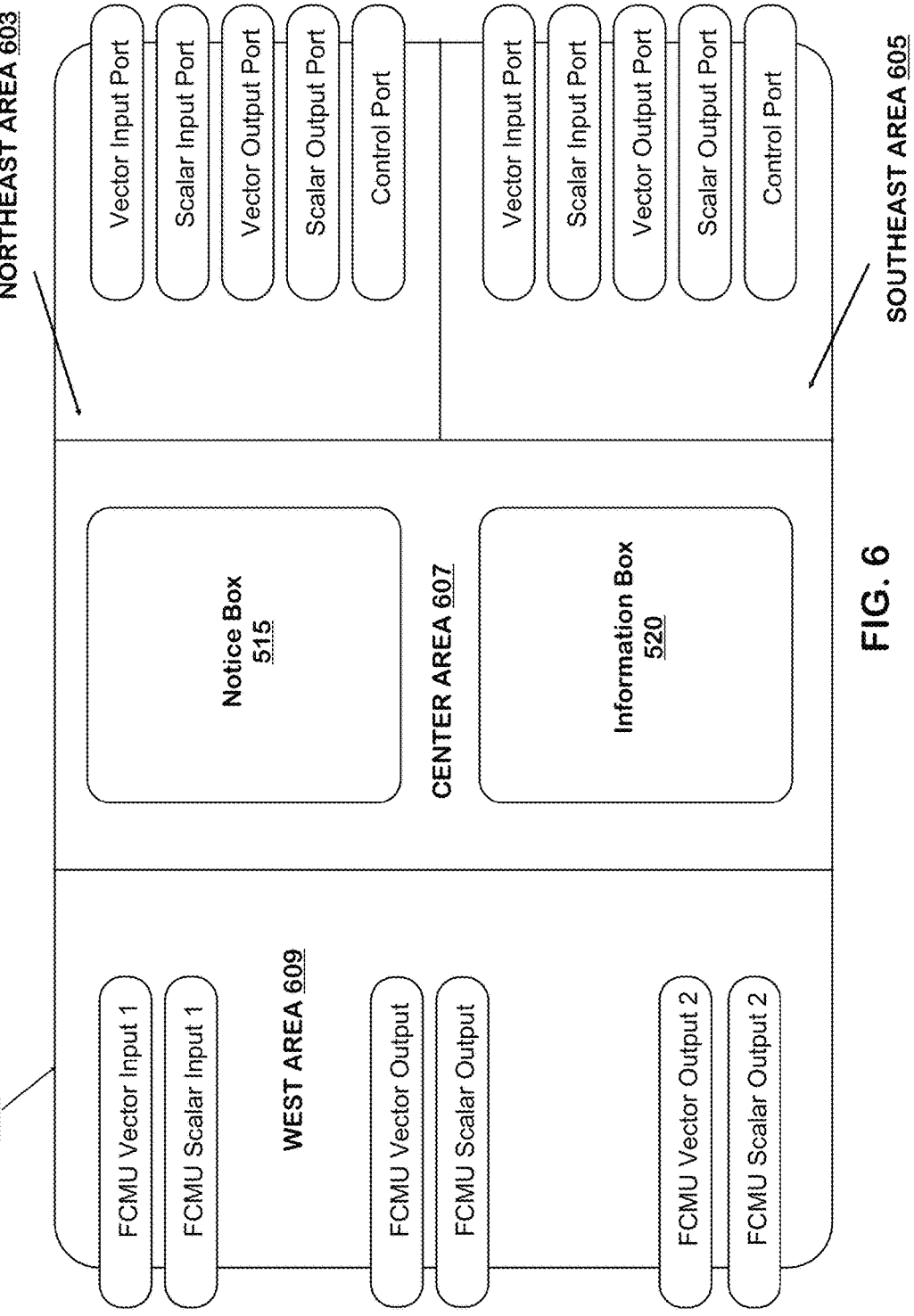
FIG. 6 is an example compute unit GUI object as used in the system for editing topology of a reconfigurable data processor.

FIG. 6 presents an example PCU GUI object 601 that represents a function mapped to a PCU in the configuration file for a reconfigurable data processor. There are four main areas or regions in the PCU box. The northwest area 603 and southwest area 605 include input and output ports, the center area 607 includes a notice box 515 and an information box 520. A west area 609 includes input and output connections to a graphical object representing a Pattern Memory Unit (PMU) not shown in FIG. 6.

Figure 7:
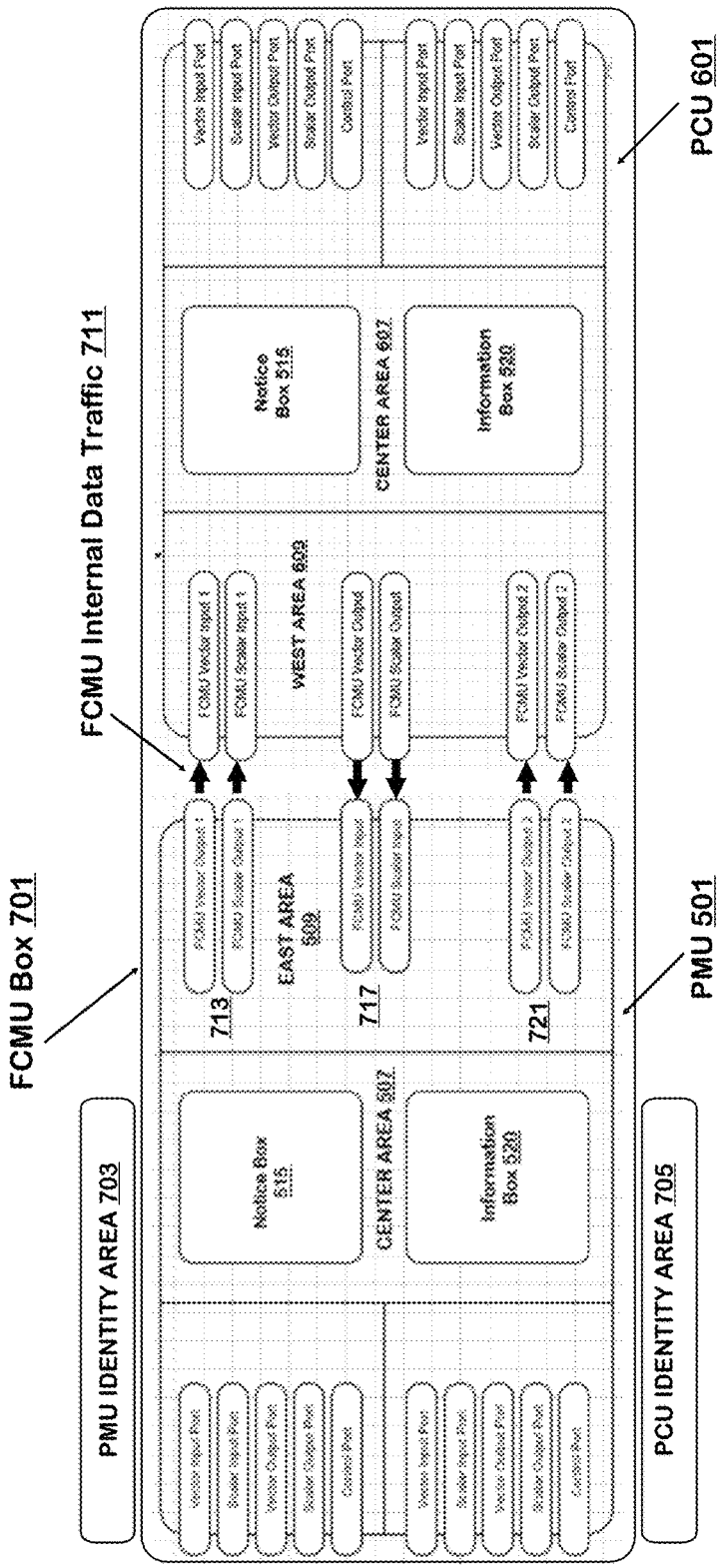
FIG. 7 presents an example Fused Compute and Memory Unit (FCMU) GUI object that includes both memory and compute units from FIGS. 5 and 6.

FIG. 7 presents an example of a Fused Compute and Memory Unit or FCMU GUI object 701 that represents a function mapped to a FCMU in configuration file for a reconfigurable data processor. The FCMU GUI object includes identifiers of a PMU GUI object and a PCU GUI object as shown in PMU identity area 703 and PCU identity area 705, respectively. The system includes unique identifiers for each PMU GUI object and PCU GUI object. The east area 509 of the PMU GUI object 501 is connected to the west area 609 of the PCU GUI object 601 for FCMU internal data traffic. As shown in FIG. 7, the FCMU vector output 1 from PMU is connected to FCMU vector input 1 and FCMU scalar output 1 in PMU is connected to FCMU scalar input 1 in PCU (indicated by a numeral 713). The FCMU vector output from PCU GUI object 601 is connected to FCMU vector output in PMU GUI object 501 and FCMU scalar output from PCU GUI object 601 is connected to FCMU scalar input in PMU GUI object 501 (indicated by a numeral 717). The FCMU vector output 2 from PMU GUI object is connected to FCMU vector input 2 and FCMU scalar output 2 in PMU GUI object is connected to FCMU scalar input 2 in PCU GUI object (indicated by a numeral 721).

Figure 8:
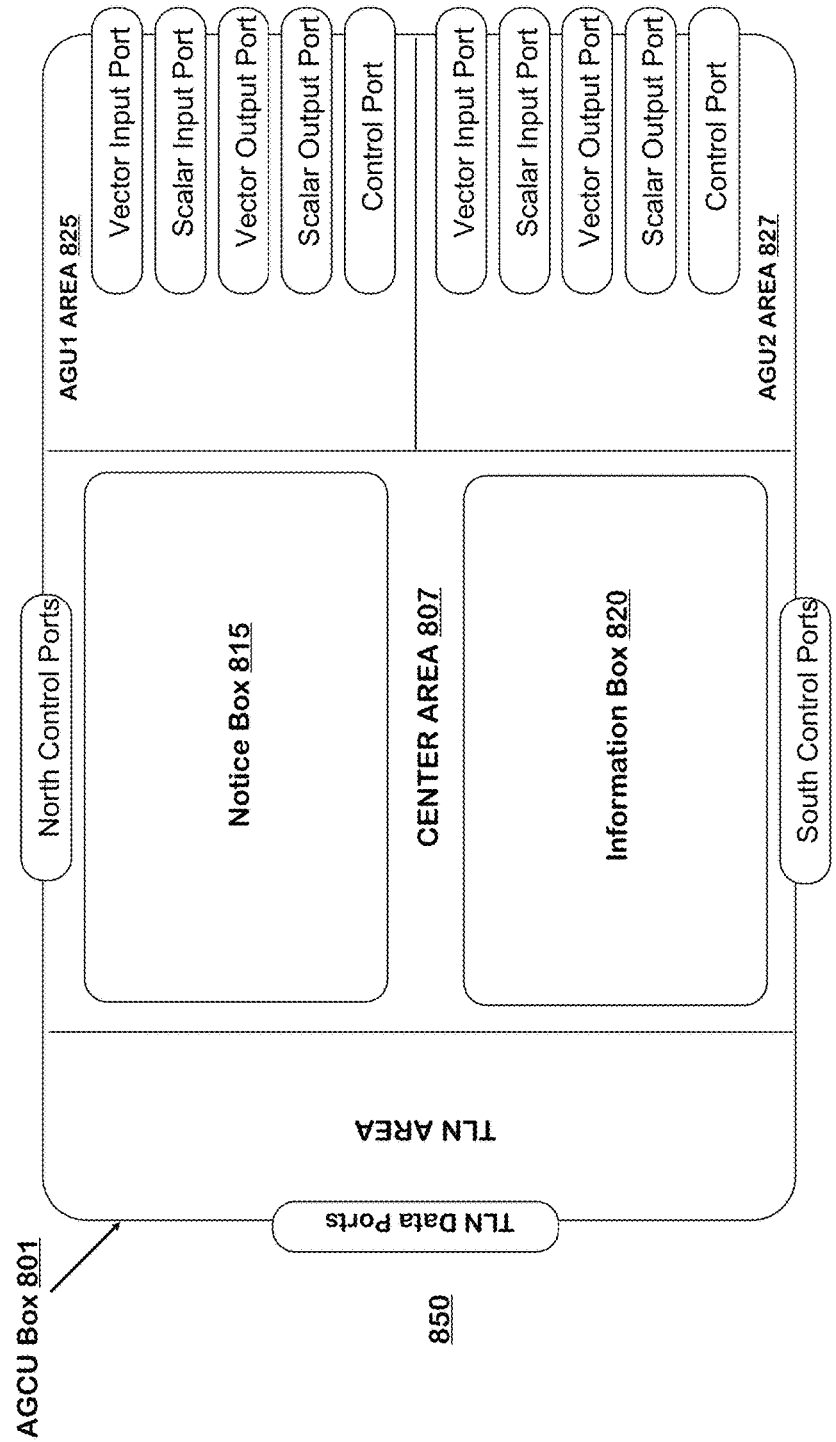
FIG. 8 presents an example Address Generation and Coalescing Unit (AGCU) GUI object as used in the left quadrant of a tile in the system for editing topology of a reconfigurable data processor.

Multiple Fused Compute and Memory Units (FCMUs) GUI objects such as up to 160 or more can be arranged in a 2-dimensional grid of rows and columns. In one implementation, the FCMUs GUI objects can be arranged in 32 rows and 5 columns in the tile. Each tile can have four AGCUs GUI objects in four quadrants (NW, NE, SW, and SE) of the tile. Communication between the components can occur over three physical networks: vector network, scalar network and control network. A grid of switches controls the flow of packets between the components. FIG. 8 presents an example AGCU GUI object 801 that represents a function mapped to an AGCU in configuration file for a reconfigurable data processor. The AGCU GUI object 801 illustrated in FIG. 8 can be mapped to an AGCU positioned in a left quadrant of the tile. The AGCU GUI object consists of two address generation units (AGUs) which are shown in AGU1 area 825 and AGU2 area 827. The AGCUs GUI objects are connected to the top-level network (TLN) via TLN data ports 850. The center area 807 contains a notice box 815 and information box 820 for presenting results of simulation and error messages.

Figure 9:
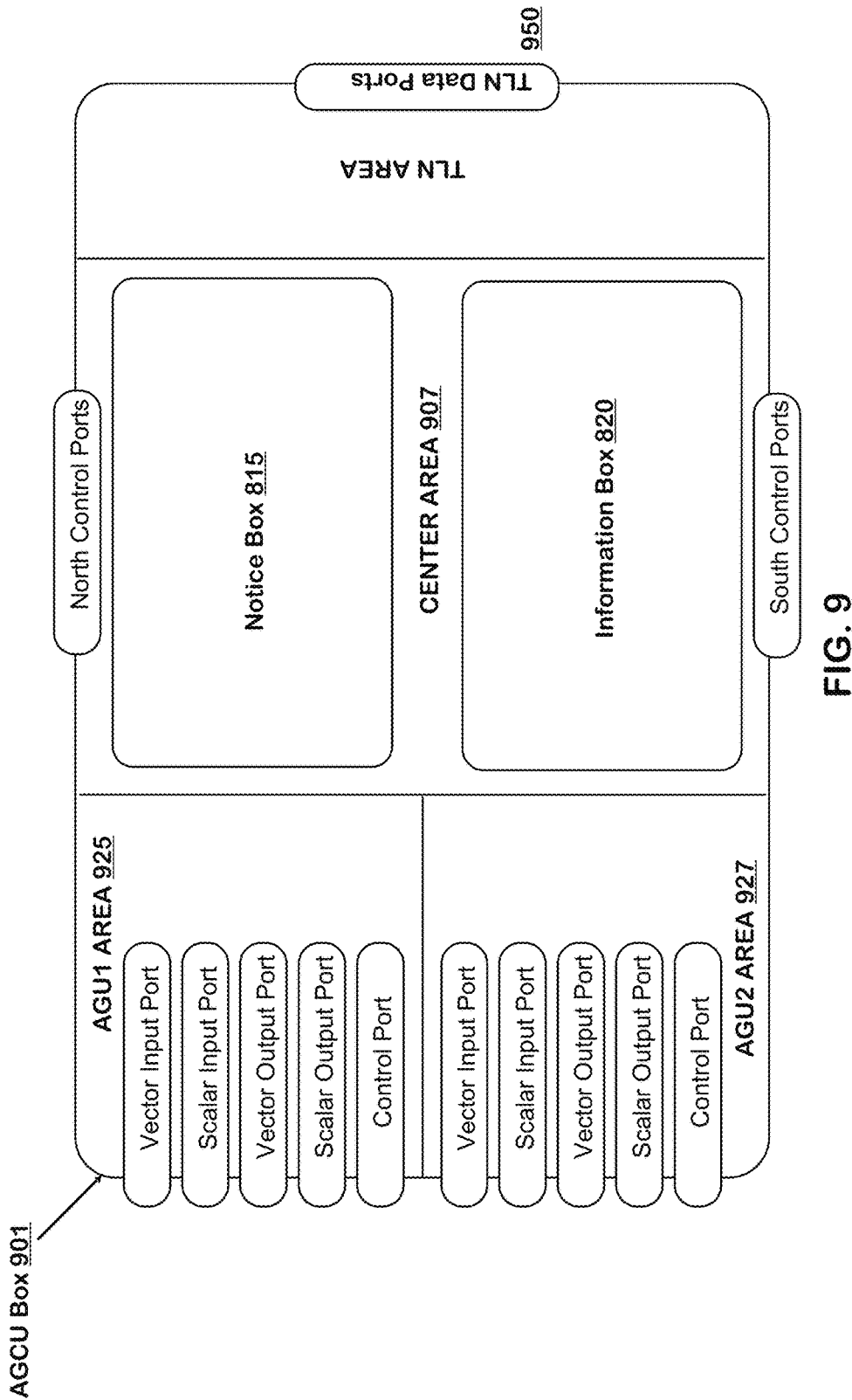
FIG. 9 presents an example Address Generation and Coalescing Unit (AGCU) GUI object as used in a right quadrant of a tile in the system for editing topology of a reconfigurable data processor.

FIG. 9 shows an image of an AGCU GUI object 901 that represents a function mapped to an AGCU in configuration file for a reconfigurable data processor. The AGCU GUI object 901 can be mapped to an AGCU positioned in a right quadrant of the tile and has an architecture similar to the AGCU GUI object 801. The central area 907 includes notice box 815 and information box 820. There are two AGUs GUI objects shown in AGU1 area 925 and AGU2 area 927. The TLN data ports are positioned on the right side of the AGCU box as shown by a label 950.

Figure 10A:
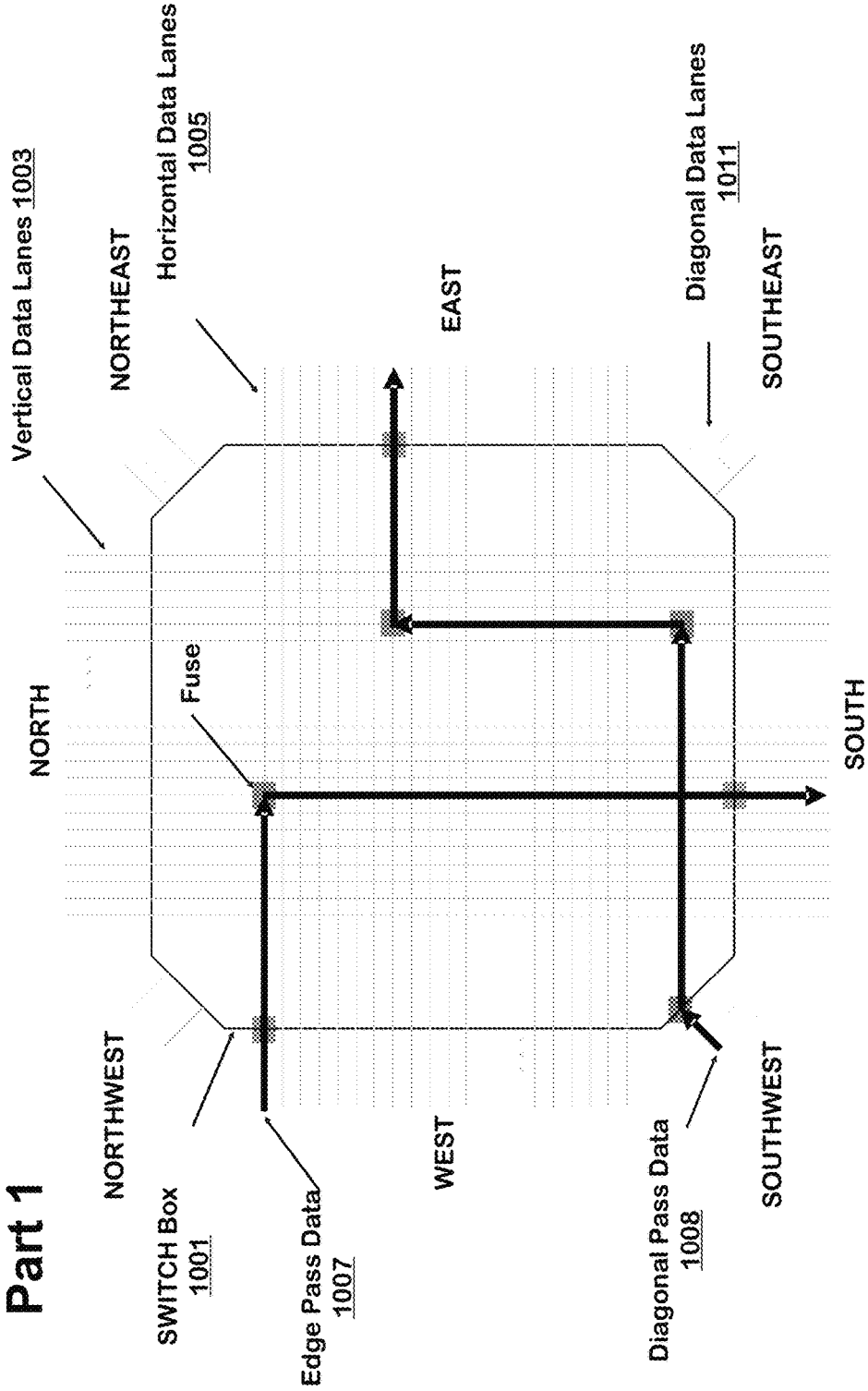
FIG. 10A presents an example switch GUI object as used in the system for editing topology of a reconfigurable data processor.

FIG. 10A presents an example switch GUI object in a switch box 1001 as displayed on the graphical display of the system for editing topology of a reconfigurable data processor. The switch GUI object represents a function mapped to a switch in a reconfigurable data processor. The switch GUI object comprises of horizontal and vertical data lanes. The black colored lines 1007 and 1008 represent routing through the switch. The vertical data lanes 1003 and horizontal data lanes 1005 can carry edge pass data 1007 as shown in FIG. 10A. The vertical data lanes run along north-south direction and horizontal data lanes run along east-west direction. The diagonal data lanes 1011 are connected to the switch GUI object along northwest, northeast, southwest, and southeast boundaries of the switch. Diagonal pass data 1013 can pass through diagonal data lanes as shown in FIG. 10A.

Figure 10B:
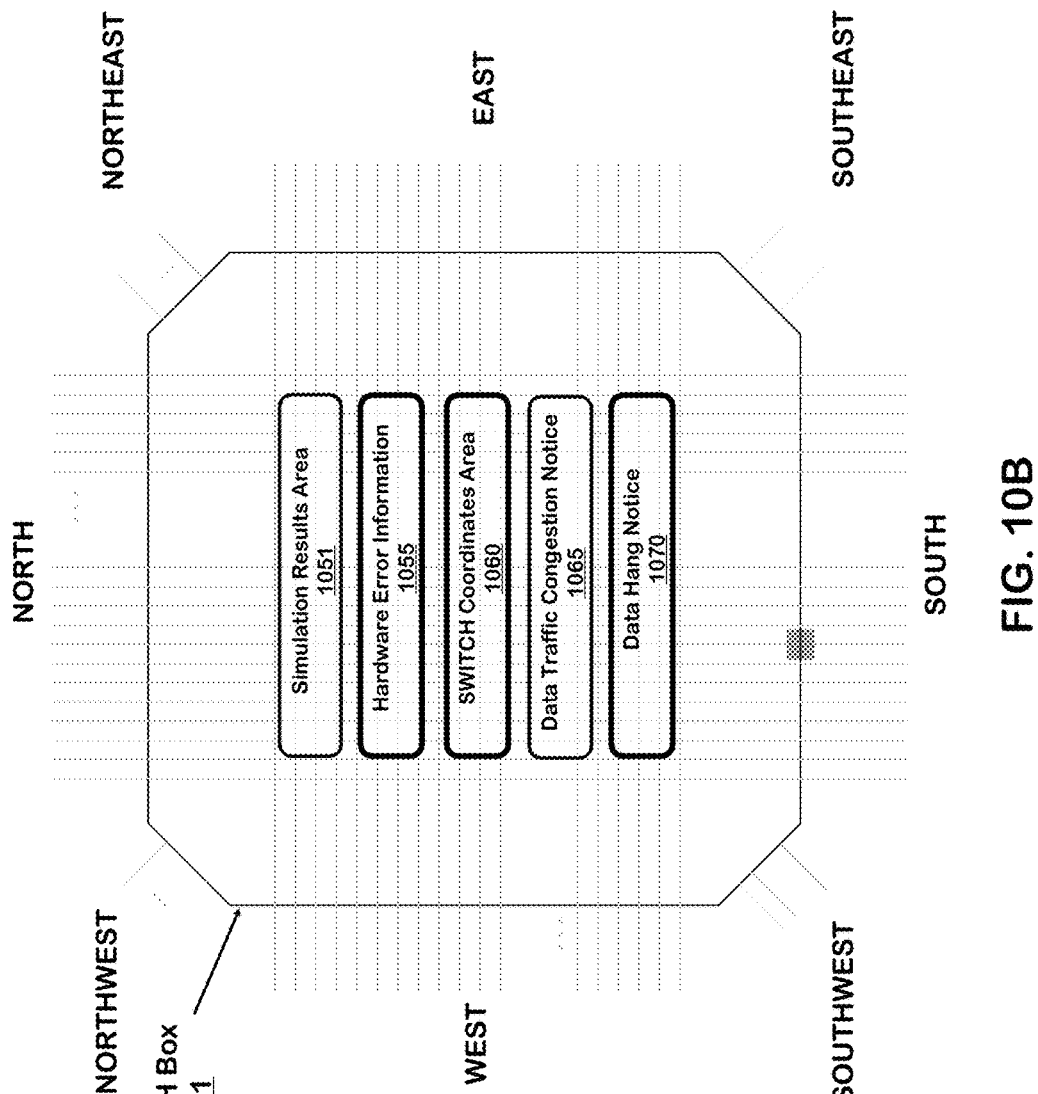
FIG. 10B presents the switch GUI object from FIG. 10A with an overlay for presenting information and results for a topology.

FIG. 10B illustrates an overlay showing functions in the switch GUI object of FIG. 10A mapped to a switch in a reconfigurable data processor. The overlay includes a simulation results area 1051, a hardware error information area 1055, a switch coordinates area 1060, a data traffic congestion notice area 1065, and a data hang notice area 1070. These areas in the overlay are used to display results of simulation and hardware errors for a topology. The overlay areas can also provide information about data congestion and data hang for a topology. The coordinates of the switch GUI object on the tile can be displayed in the switch GUI object coordinates area. The information provided by the system in the overlay area is useful during development and debugging of configurable data processor.

The system includes logic to receive data indicating traffic on the interconnection lines from simulation of the topology. The system can then display GUI objects (or graphical objects), or text for display in data traffic congestion notice area 1065 with the selected portion of the topology (such as a switch GUI object) to represent data traffic congestion. The system can also update (change) or highlight the GUI object representing the hardware asset or unit to indicate data traffic congestion or error results. This information can be used for debugging and editing the topology to remove data traffic congestion.

The system includes logic to generate hardware error information to indicate hardware failure in hardware error information area 1055. This can indicate an error in the topology in at least one processing element (or unit, or component) in the reconfigurable processor. The system can display hardware asset or hardware unit errors as a graphical object, or text. The system can also update (change) or highlight the GUI object representing the hardware asset to indicate error conditions or error results. The user can use this information for debugging and editing the topology to remove the hardware error.

The system includes logic to generate a data hang notice for the topology to indicate at least on nonresponsive processing element in the reconfigurable data processor. The system can display this message as a graphical object, GUI object or a text in the data hang notice area 1070. The system can also update (change) or highlight the GUI object representing the hardware asset or unit to indicate data hang condition or error results. The user can then use this information for debugging and editing the topology to remove data hang issue.

Figure 11:
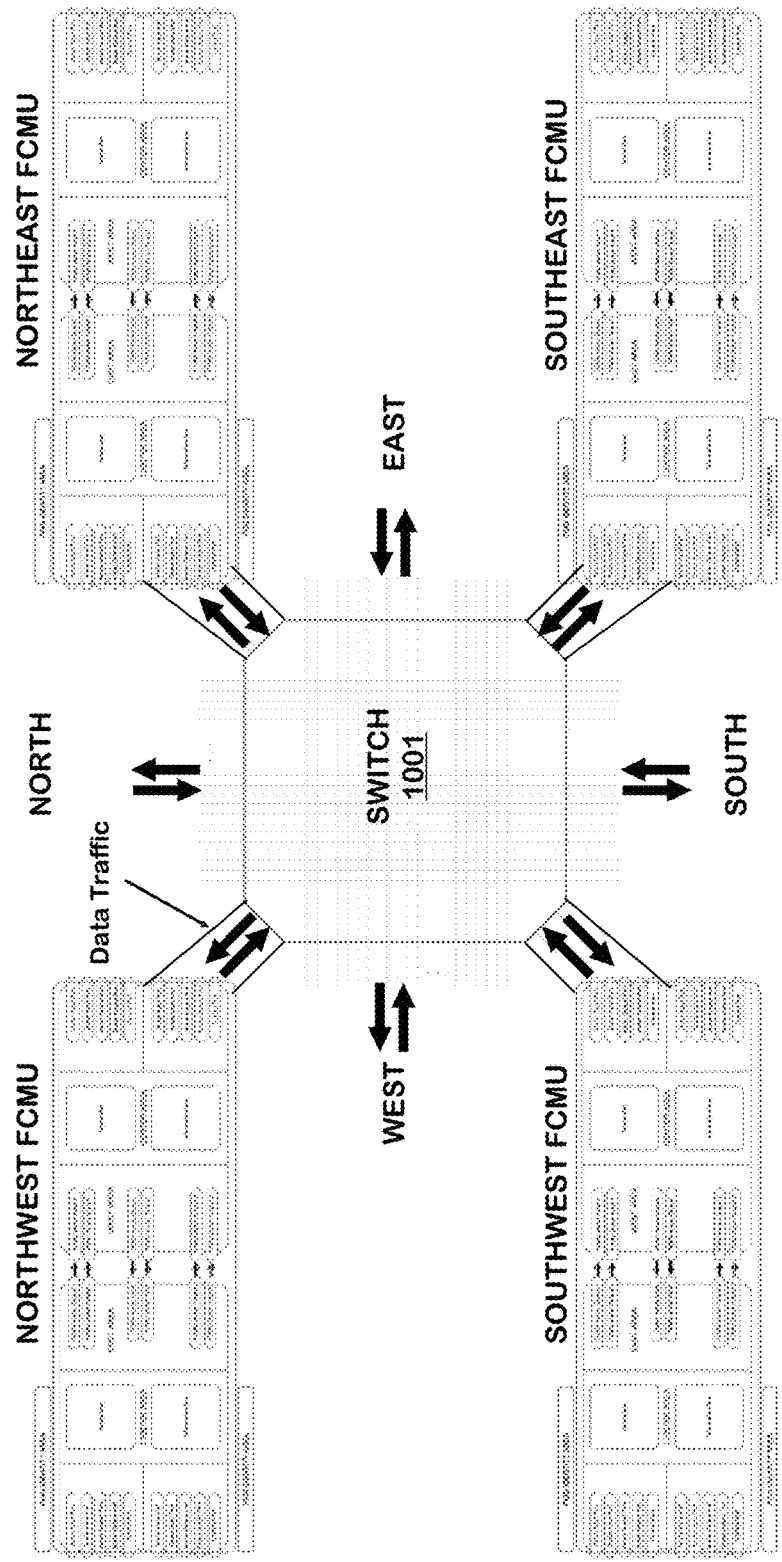
FIG. 11 presents one switch local cluster GUI object as used in the system for editing the topology of a reconfigurable data processor.

FIG. 11 illustrates one switch local cluster GUI object 1101 in which the switch GUI object 1001 is connected to four FCMU GUI objects via four diagonal data lanes. FIG. 11 is a local cluster that is part of the topology defined in the configuration file. The local cluster 1101 shows the relative positions of processing elements and a switch. The processing elements communicate via the switch in this topology. Each processing element can represent different functions and their positions on the interface indicate their relative positions on the hardware. The configuration file includes a configuration that defines a topology which maps functions to hardware assets that have relative positions as shown in the local cluster of FIG. 11. In the switch local cluster GUI object, four FCMU GUI objects are positioned along northwest, northeast, southwest, and southeast edges of the switch. Each GUI or graphical object in FIG. 11 represents features of the function that the configuration file assigns to the FCMU. The position of the graphical object on the user interface represents its mapping to physical hardware. The data traffic passes through diagonal data lanes positioned along the above mentioned four edges of the switch. The data lanes along north, south, east and west directions connect switch GUI object 1001 to other switch GUI objects positioned in the above mentioned four directions.

Figure 12:
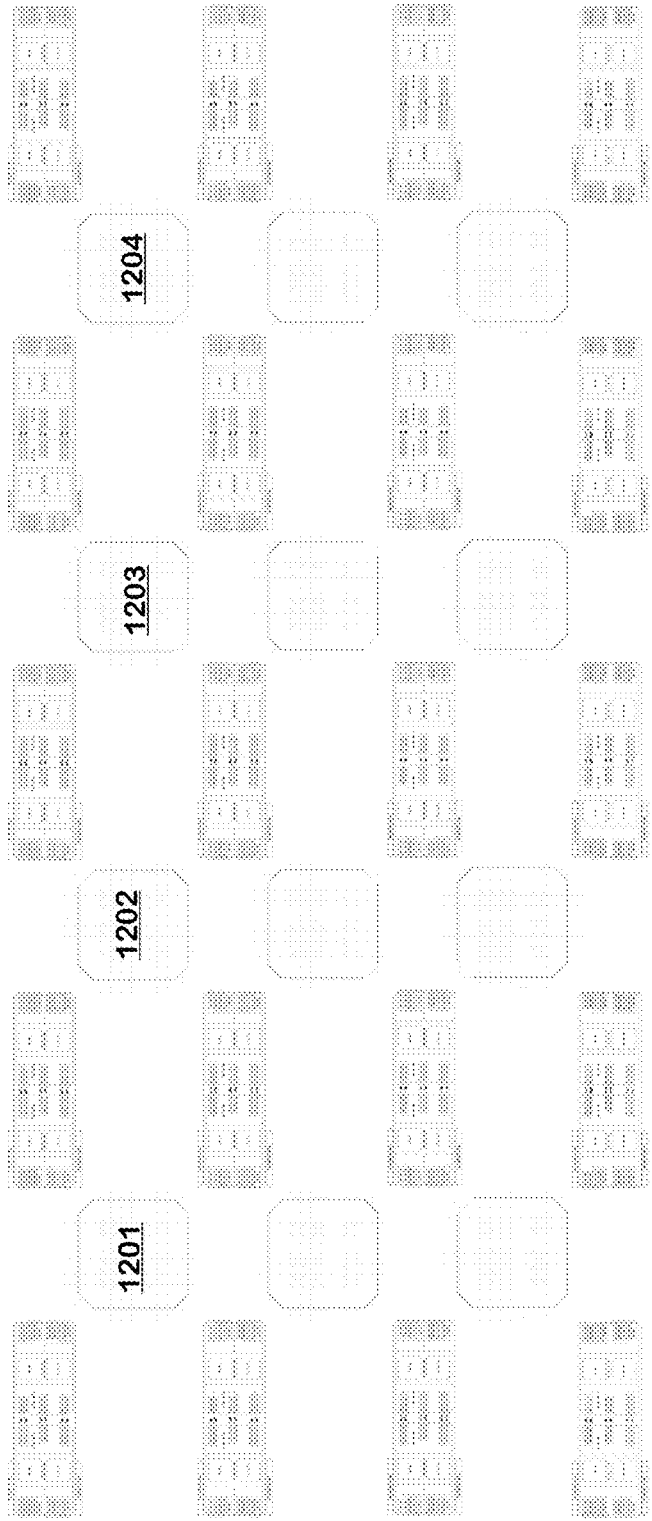
FIG. 12 presents a multiple switch clusters layout GUI object in the system for editing the topology of a reconfigurable data processor.

FIG. 12 presents a multiple switch cluster layout in a graphical interface including graphical objects representing functions mapped to FCMUs connected by 12 switches as shown. Switches are arranged in three rows. The first row illustrates graphical objects representing switches 1201, 1202, 1203, and 1204. The second and third rows also include graphical objects with four switches each. Switches are not selected and moved on the user interface rather these provide an anchor for the user interface. The graphical objects representing processing elements (such as FCMUs) or links can be moved from one location to another resulting in change in allocation of functions mapped to the processing elements. The changes are reflected in the configuration stored in the configuration file which results in update to the topology.

Figure 13:
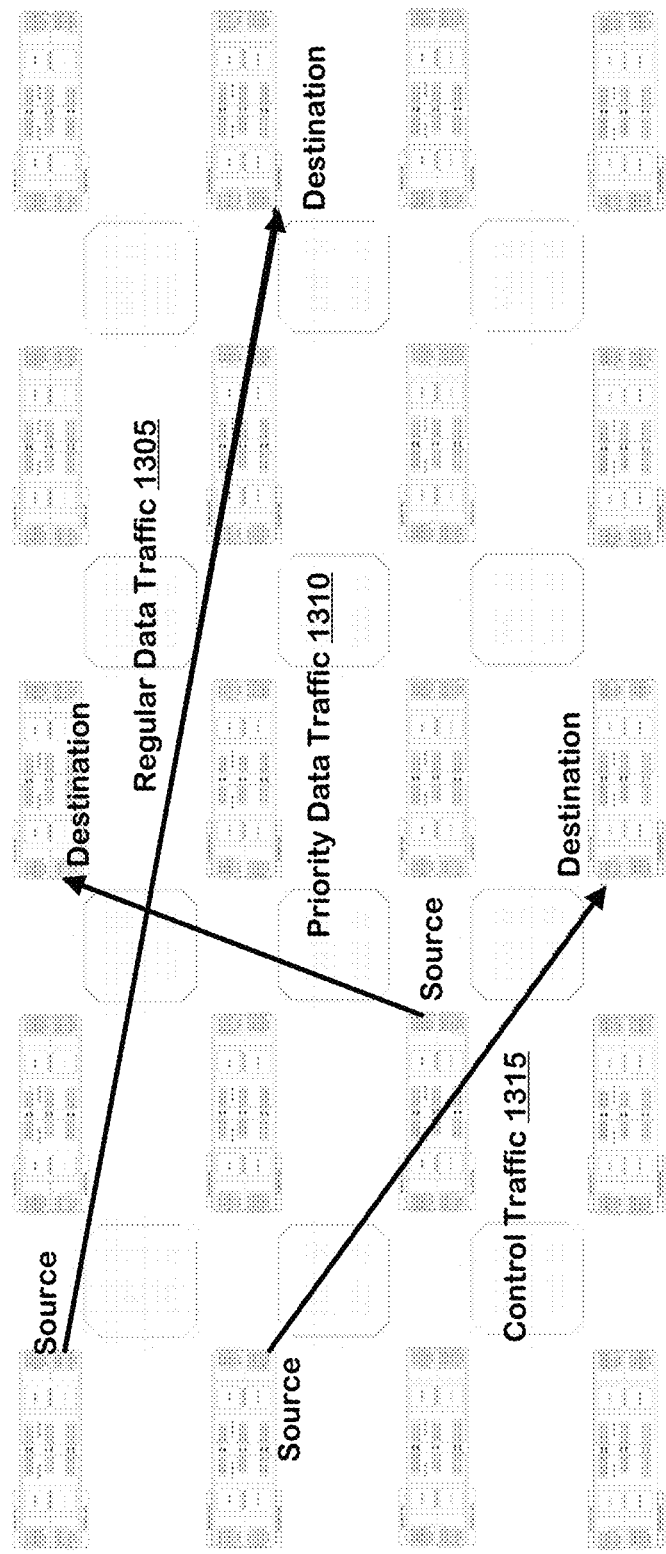
FIG. 13 presents a direct route connection overlay on a GUI object like that of FIG. 12 between source and destination units such as FCMUs.

FIG. 13 shows the multiple switch cluster layout of FIG. 12 with GUI objects representing links or interconnection routes between source and destination GUI objects which represent processing elements such as FCMUs. FIG. 13 presents an overlay with direct route connection from a source FCMU GUI object to a destination FCMU GUI object. Direct routes for three different types of data traffic are shown: a regular data traffic route 1305, a priority data traffic route 1310 and a control traffic route 1315. Source and destination GUI objects for the three direct routes are also shown in FIG. 13. A direct route can be considered as logical connection that illustrates a link or an interconnection route between a source GUI object and a destination GUI object. The source and destination GUI objects represent functions placed at processing elements (or components) in the reconfigurable data processor.

Figure 14:
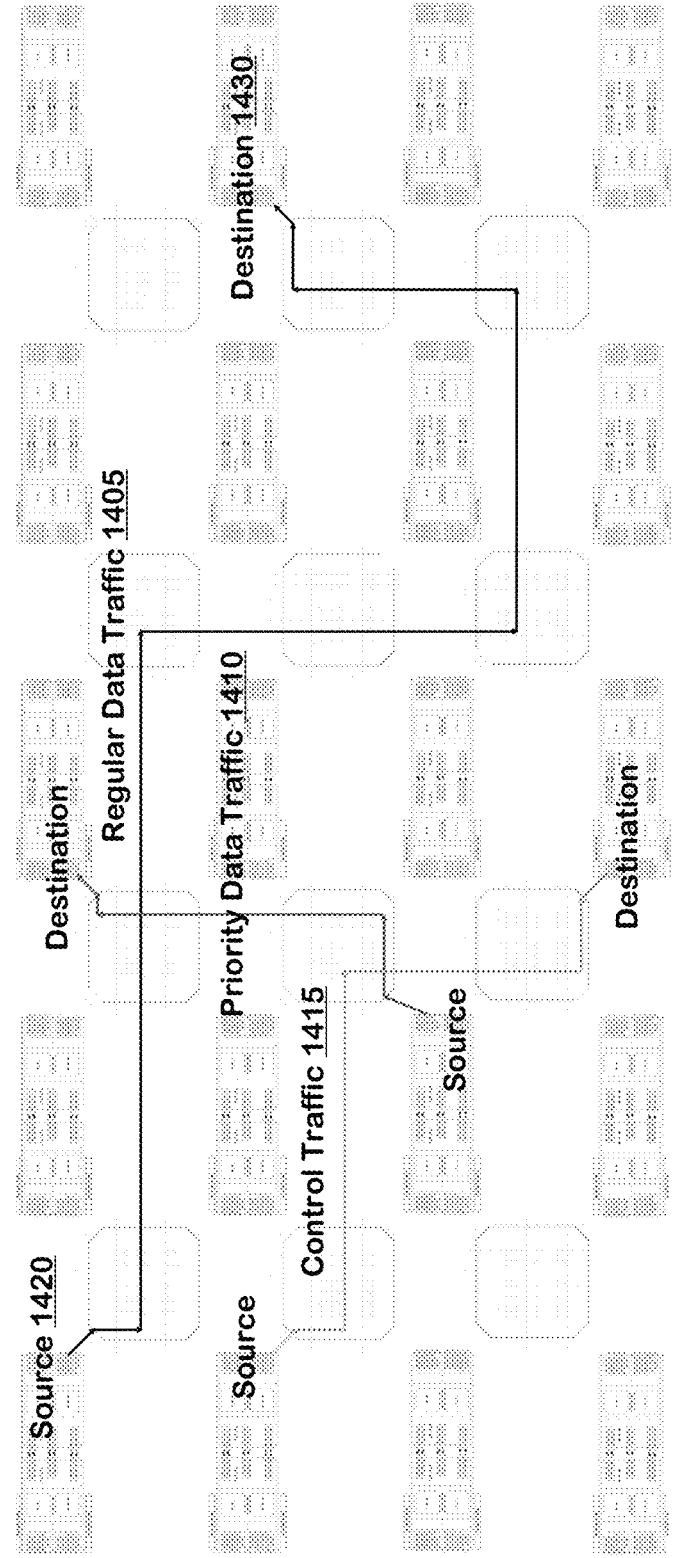
FIG. 14 presents a detail route connection overlay on a GUI object like that of FIG. 12 between source and destination units such as FCMUs.

FIG. 14 presents an overlay with detail routes corresponding to the three direct routes in FIG. 13 on a graphical interface including objects like that of FIG. 12. The detail routes in FIG. 14 link the same source and destination GUI objects for the three direct routes in FIG. 13. However, detail routes use horizontal and vertical data lanes to connect the source GUI object to a destination GUI object. For example, regular data traffic route 1405 starts from a source 1420, passes horizontally through three switch GUI objects in the first row, then the route moves down vertically and passes through two switch GUI objects. This is followed by horizontal passage in the third row followed by vertical passage through one switch GUI object to reach the destination 1430. The routes 1410 and 1415 correspondingly display detail routes for priority data traffic and control traffic, respectively. The detail routes can be determined based on configuration in the configuration file. For example, a configuration can define the number of switches arranged in a horizontal manner and the number of switches in a vertical manner in a link or an interconnection route from a source processing element to a destination processing element. A configuration can also define a general direction i.e., horizontal or vertical for a link or an interconnection route. The system includes logic to display data routes, links (or interconnection routes) in direct form and detail form as shown in FIGS. 13 and 14 respectively.

FIG. 14 presents an example topology that places functions of the graph at corresponding processing elements and links arranged according to relative positions in selected portion of the topology. For example, "source 1420" on the graphical interface in FIG. 14 is a graphical object that represents a function placed at a hardware asset (or processing element, or component, or unit) having that location. Likewise FIG. 14 shows a graphical object "destination 1430" that represents a function placed at a hardware asset having that location. FIG. 14 also shows graphical objects labeled 1405, 1410, and 1415 representing functions placed at corresponding links. The graphical objects are arranged on the graphical interface or graphical display according to relative positions of hardware assets or processing elements in a selected portion of the topology.

The technology disclosed can detect a user input identifying a graphical object representing a function placed at a corresponding processing element or link and launch a procedure to change the placement of the corresponding function in the topology. For example, the system can detect a user input, moving (or dragging) the graphical object "destination 1430" to a new location on the graphical display. The system can launch the procedure to update the configuration file to implement change to the topology including updating placement of the function to another hardware asset at the new location which will have a new position relative to other hardware assets in the topology. The system updates the graphical representation based on the updated topology including updated placement of the function.

Figure 15:
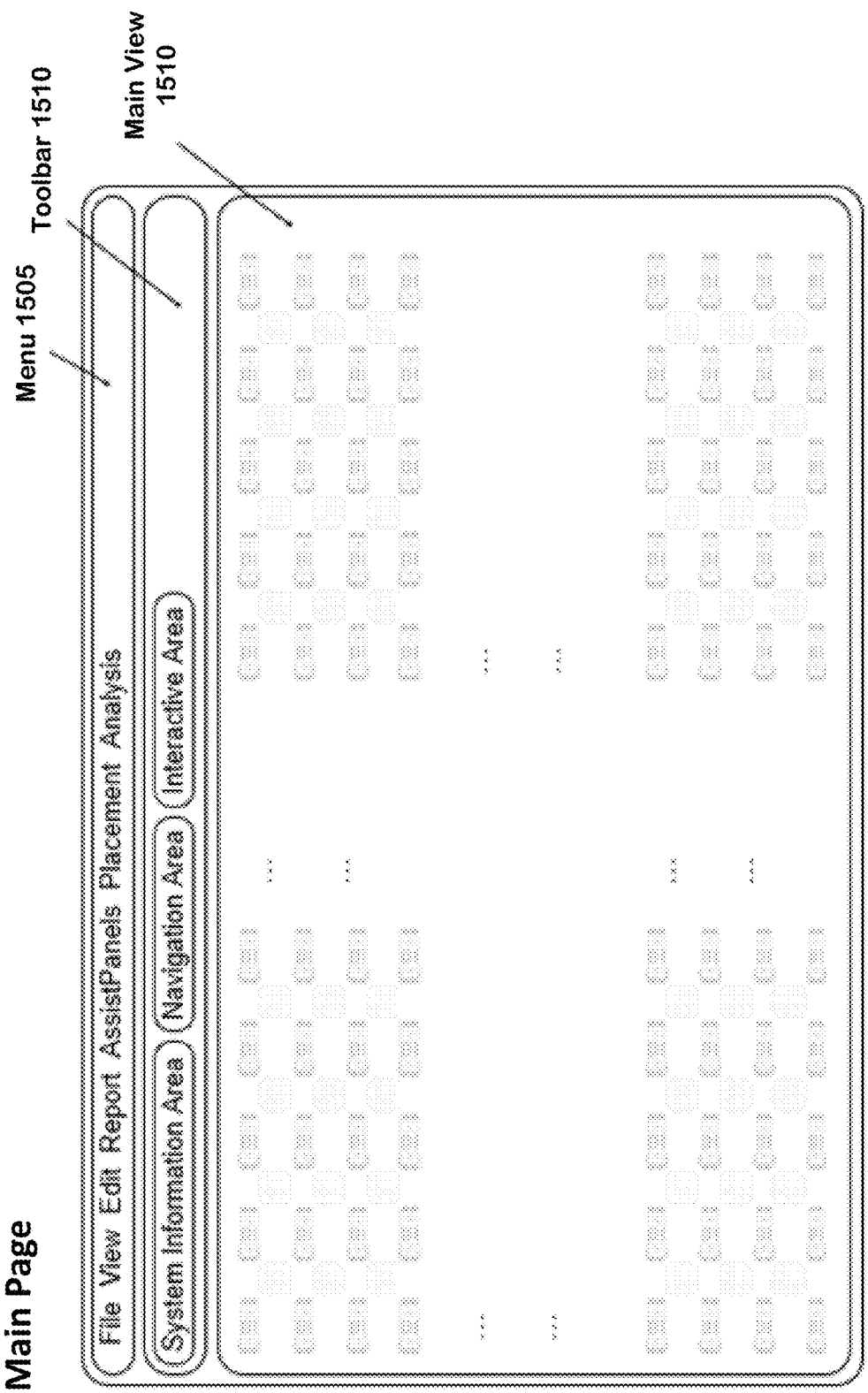
FIG. 15 presents a main page view of the graphical display of the system for editing the topology of a reconfigurable data processor.

FIG. 15 presents a main page view of the graphical display of the system for editing a topology of the reconfigurable processor. The main page includes a menu 1505, a toolbar 1510 and a main view area 1510. The system displays the tiles including the FCMU GUI objects and connections between the FCMU GUI objects in the main view area 1510. A user can interact with GUI objects representing processing elements or components on the main page using an input device such as keyboard, mouse, or other pointing devices. The graphical object menu 1505 represents menu provided by the tool that includes a list of features provided by the system. For example, the menu 1505 includes File, View, Edit, Report, AssistPanels, Placement and Analysis menu items. It is understood that the system can provide other functionality to users by including additional menu items in the menu 1505. We provide details of the menu items in the following paragraphs.

The graphical object toolbar 1510 represents a toolbar provided by the tool that includes three user interface elements or commands including System Information Area, Navigation Area, and Interactive Area. The system information area command invokes "systemInformation" API which copies the current system information to user's clip board. The user can paste this data on another area in the graphical display such as a memo or in another application.

Navigation area command includes two options to navigate the topology. A "navigation by position" command invokes "navigationByPosition" API which takes a processing element's (or unit's or component's) position as input. The system then zooms in to the GUI object representing the processing element matching input position. The system can zoom out of the current view of topology and then zoom in to display the location of GUI object representing the processing element matching the input position on the main view. As a result, the main view of the graphical display changes.

A "navigation by name" command invokes "navigationByName" API which takes a processing element's (or unit's or component's) name or identifier as input. The system searches the topology using the input name or identifier and when a match is found, the system zooms in to the GUI object representing the processing element including a name or an identifier matching the input name or input identifier. The system can zoom out of the current view of topology and then zoom in to display the location of GUI object representing the matched processing element on the main view on the graphical display. As a result, the main view of the graphical display changes.

The interactive area command invokes the "interactiveArea" API which can provide alerts, warnings and error notifications on the display. As a result, the main view area of the display can change.

Figure 16:
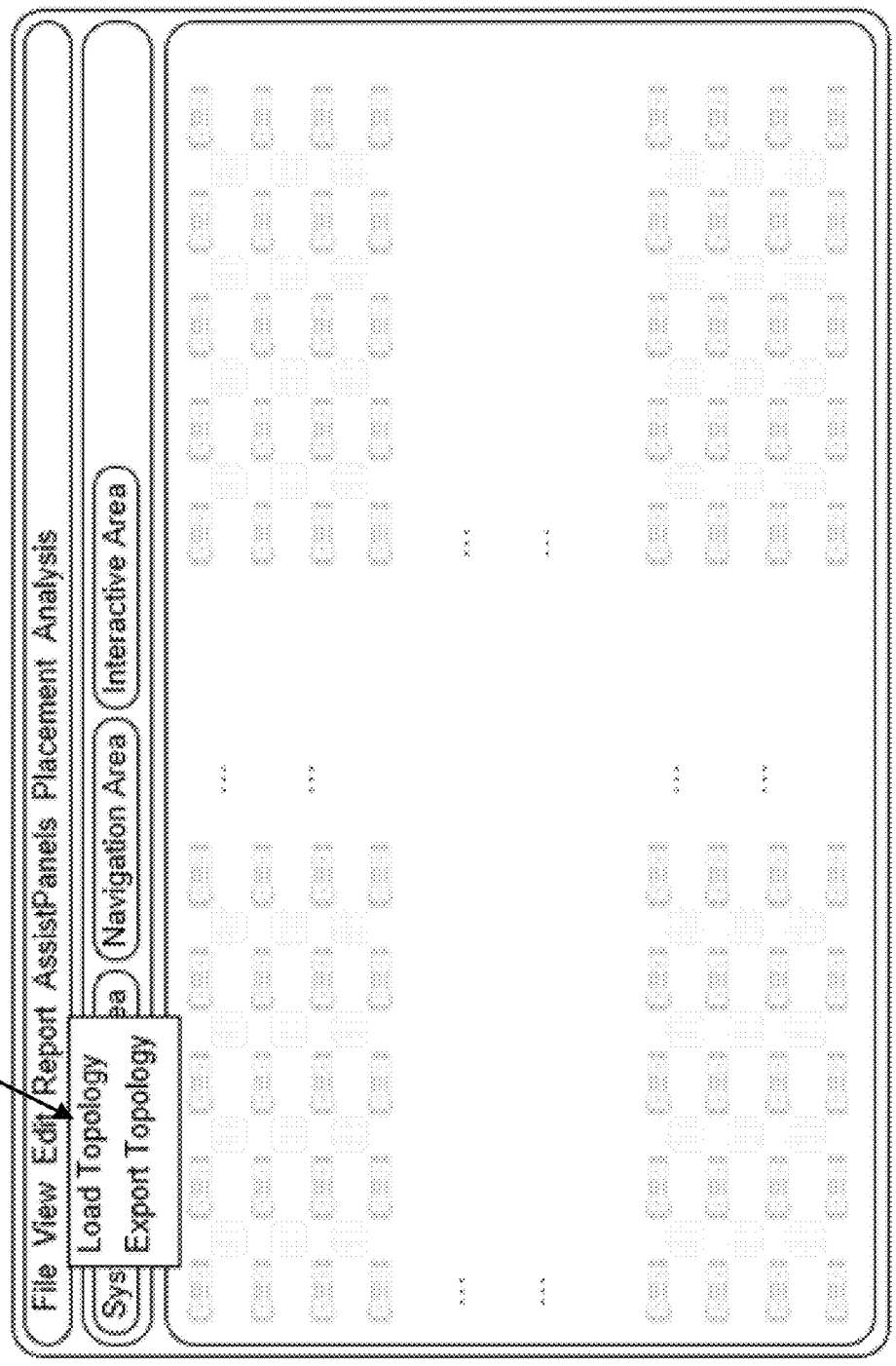
FIG. 16 presents a File functions drop down GUI menu provided by the system for editing the topology of a reconfigurable data processor.

FIG. 16 presents a File functions or commands drop down GUI menu 1605 representing the File menu item provided by the IDE. When a user interacts with the File drop down GUI menu by using a point and click device or a keyboard key combination, a drop-down list 1605 of File commands is displayed. For example, in FIG. 16, the File menu item provides two functions: Load Topology and Export Topology. The functions in the File menu item are implemented by Menu APIs. For example, a "loadTopology" API is invoked when the system receives "Load Topology" command from the drop-down list 1605. The loadTopology API takes a file location as input, indicating the location where the configuration file (defining the topology) is stored. The system receives the location of the file as input, opens and reads the file and displays the topology on the graphical display. The system can display the topology in the main area 1510 of the graphical display. The "Export Topology" command in the File Functions drop down GUI menu 1605 invokes "exportTopology" API which saves the topology currently displayed on the graphical display in a file. The system can provide a user interface dialog box to the user to identify the target location for saving the file. The system can save the topology in a configuration file at the specified target location or a default target location pre-defined in the system.

Figure 17:
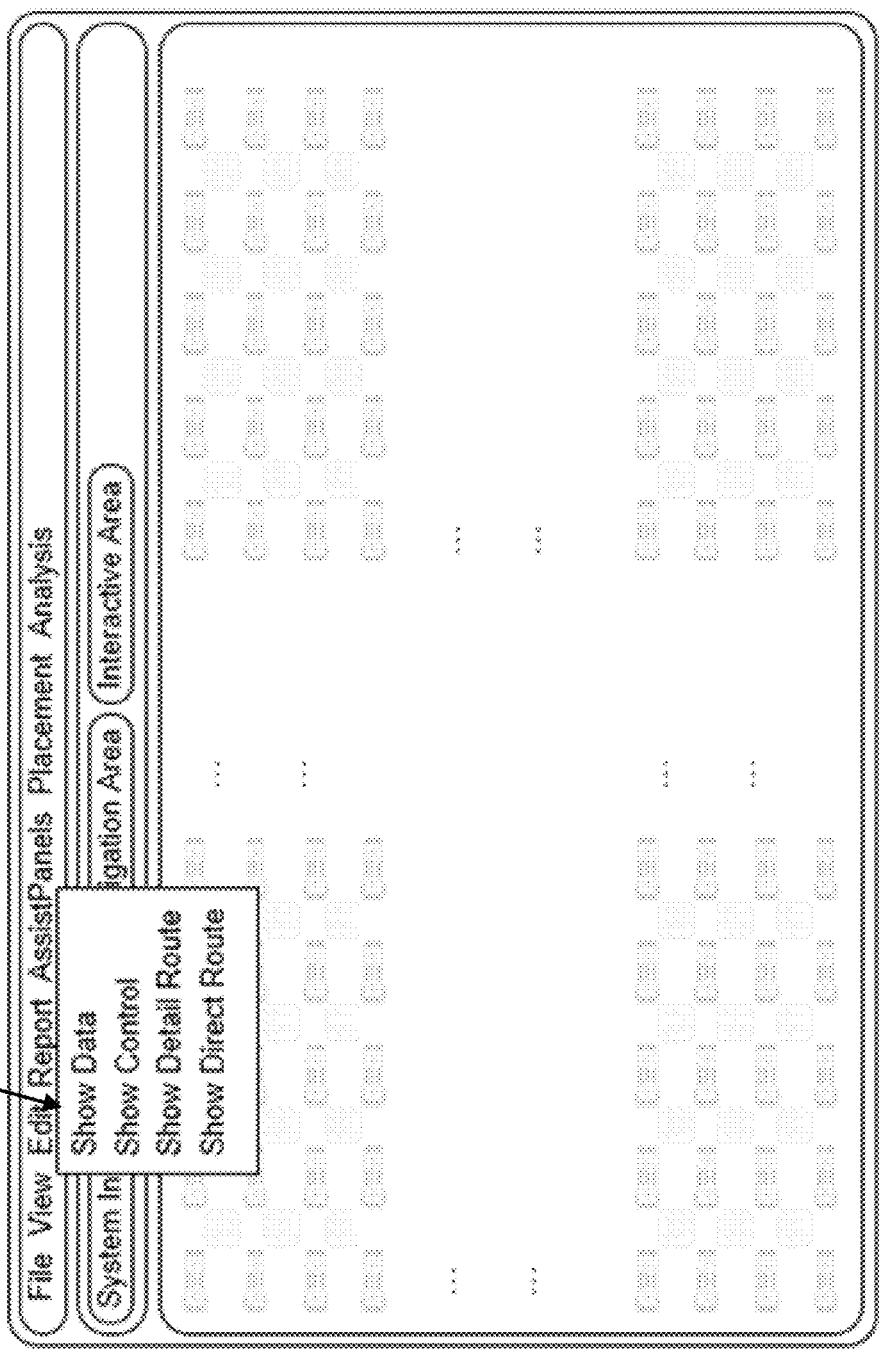
FIG. 17 presents a View functions drop down GUI menu provided by the system for editing the topology of a reconfigurable data processor.

FIG. 17 presents View functions or commands drop down GUI menu 1705 provided by the View menu item. A "Show Data" command invokes "showData" API which shows data connections on the topology. When this command is executed, the display on the main view changes to only display data connections in the topology on the graphical display. A "Show Control" command invokes "showControl" API which shows control connections on the topology. When this command is executed, the display on the main view changes to only display control connections in the topology on the graphical display. A "Show Detail Route"

command invokes "showDetailRoute" API which shows connection routes in rectangular shape on the topology as shown in FIG. 14. When this command is executed, the display on the main view changes to show connection routes (or edges) in rectangular form to mimic real circuit routes on the topology. A "Show Direct Route" command invokes "showDirectRoute" API which shows connection routes as straight line edges or direct line pointers as shown in FIG. 13. When this command is executed, the display on the main view changes to show connections routes (or edges) as straight lines on the topology.

Figure 18:
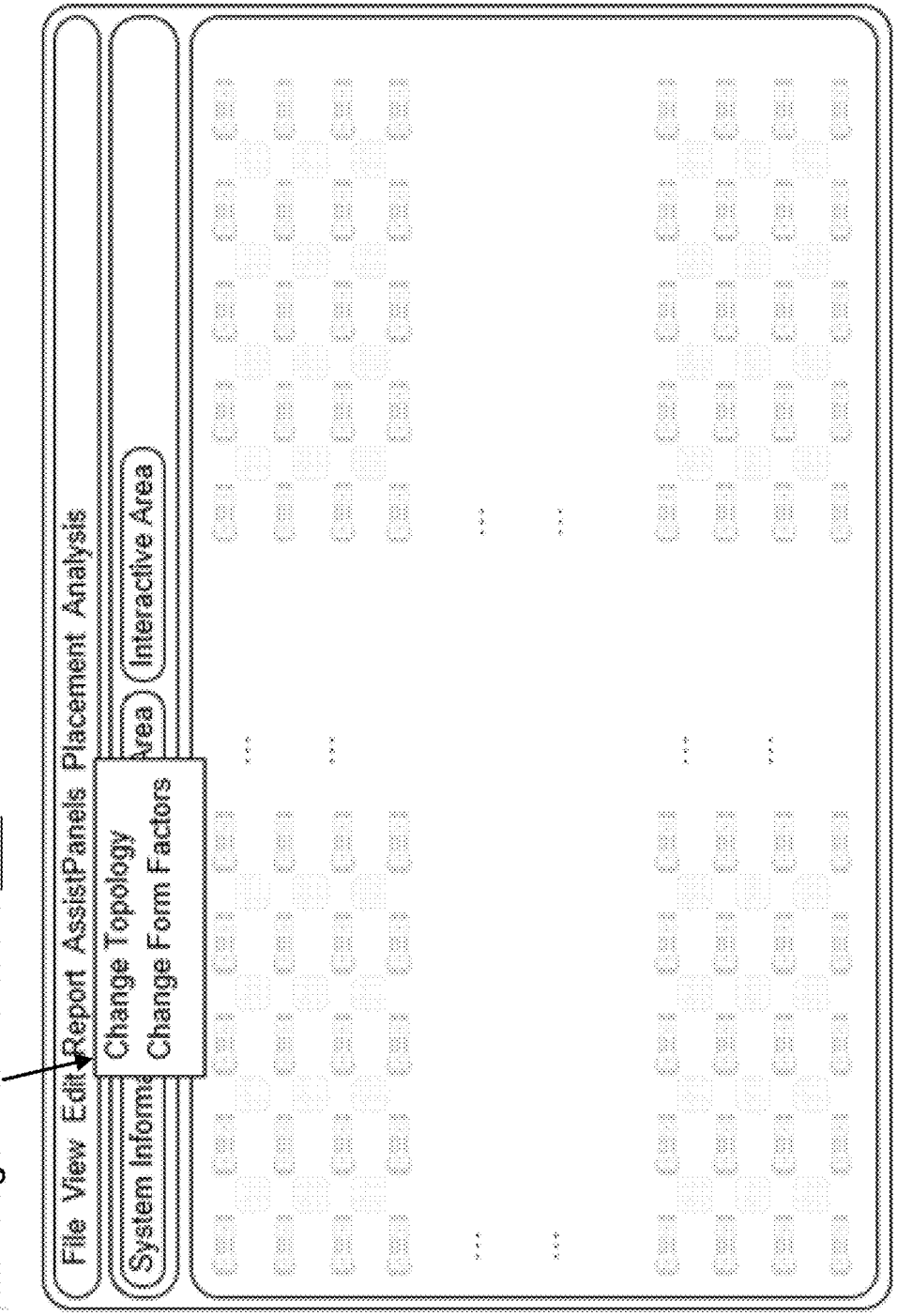
FIG. 18 presents an Edit functions drop down GUI menu provided by the system for editing the topology of a reconfigurable data processor.

FIG. 18 presents Edit functions or commands drop down GUI menu 1805 provided by the Edit menu item. A "Change Topology" command invokes a "changeTopology" API which takes as input a user's changes to a topology. The system then changes or updates the topology as input by the user. After execution of this command, the topology on the main view changes to show user's changes to the topology. A "Change Form Factors" command invokes a "changeFormFactors" API which takes a user's form factor definition as input. Examples of form factors include display sizes of switch GUI objects and GUI objects representing other hardware components or units in the topology. After the execution of this command, the system changes the main view to display changes to form factors as defined by the user.

Figure 19:
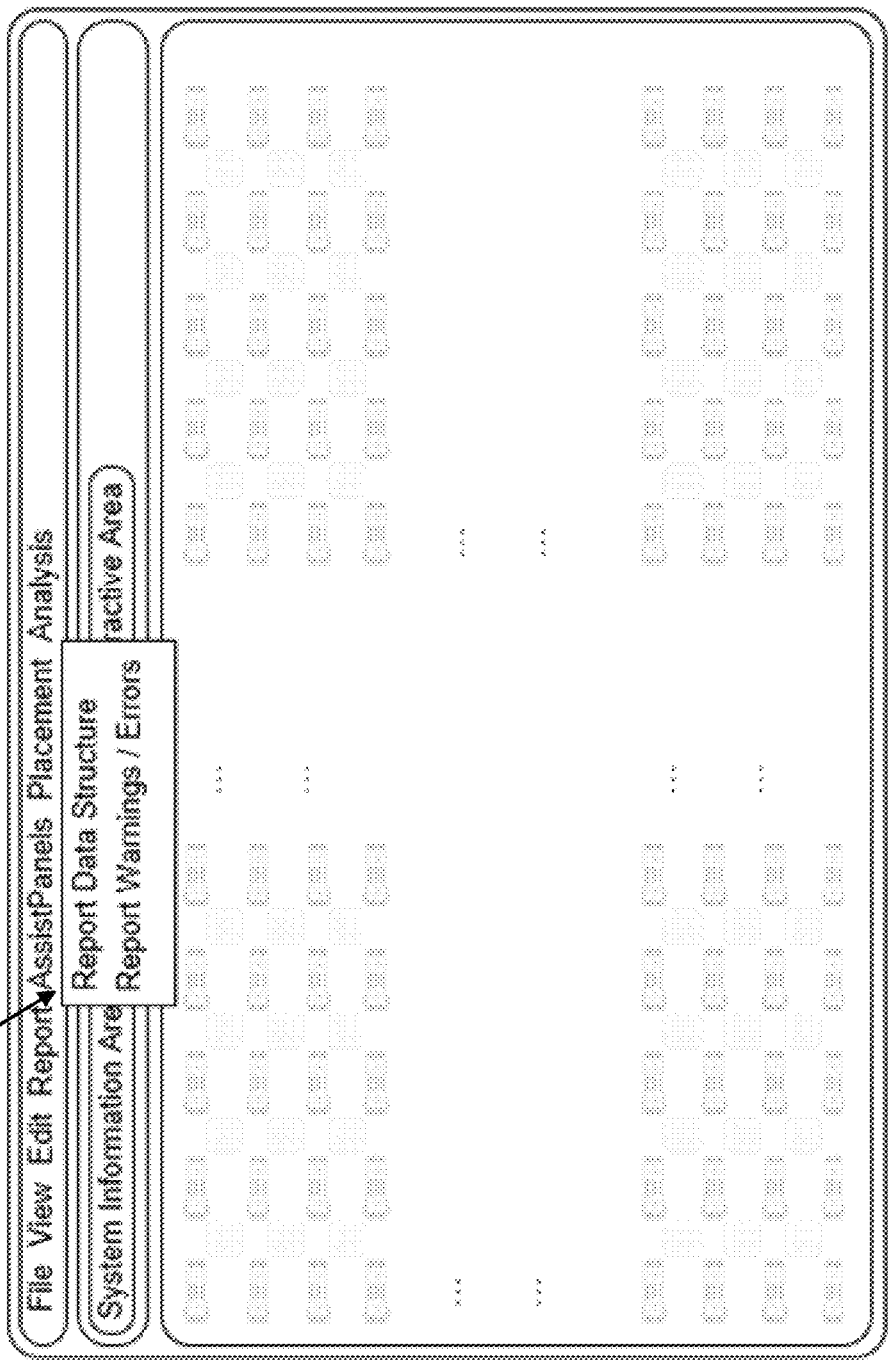
FIG. 19 presents a Report functions drop down GUI menu provided by the system for editing the topology of a reconfigurable data processor.

FIG. 19 presents Report functions or commands drop down GUI menu 1905 provided by the Report menu item. The system includes "Report Data Structure" and "Report Warnings/Errors" commands in the Report menu. The system can present reports on the graphical display or save reports in files when these commands are executed. These reports may provide detail on component usage (fraction of FCMUs used), total routes, overlapping routes, switch congestion, or other relevant errors or metrics derived from simulation or topology data.

Figure 20:
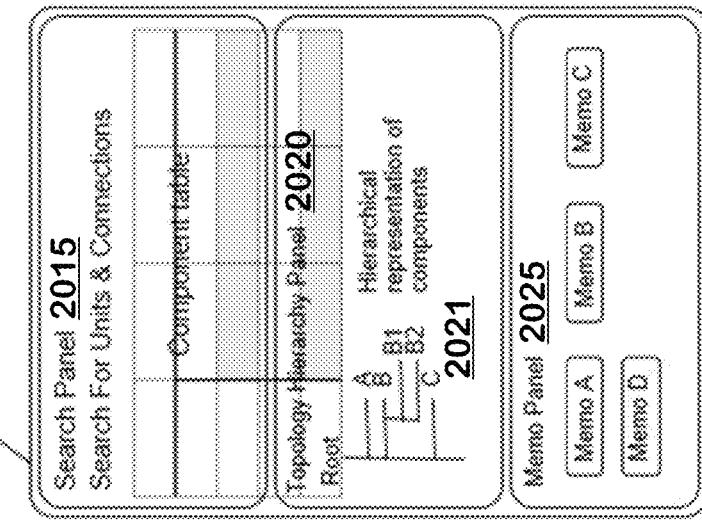
FIG. 20 presents an Assist Panels functions GUI object provided by the system for editing the topology of a reconfigurable data processor.
Figure 20:
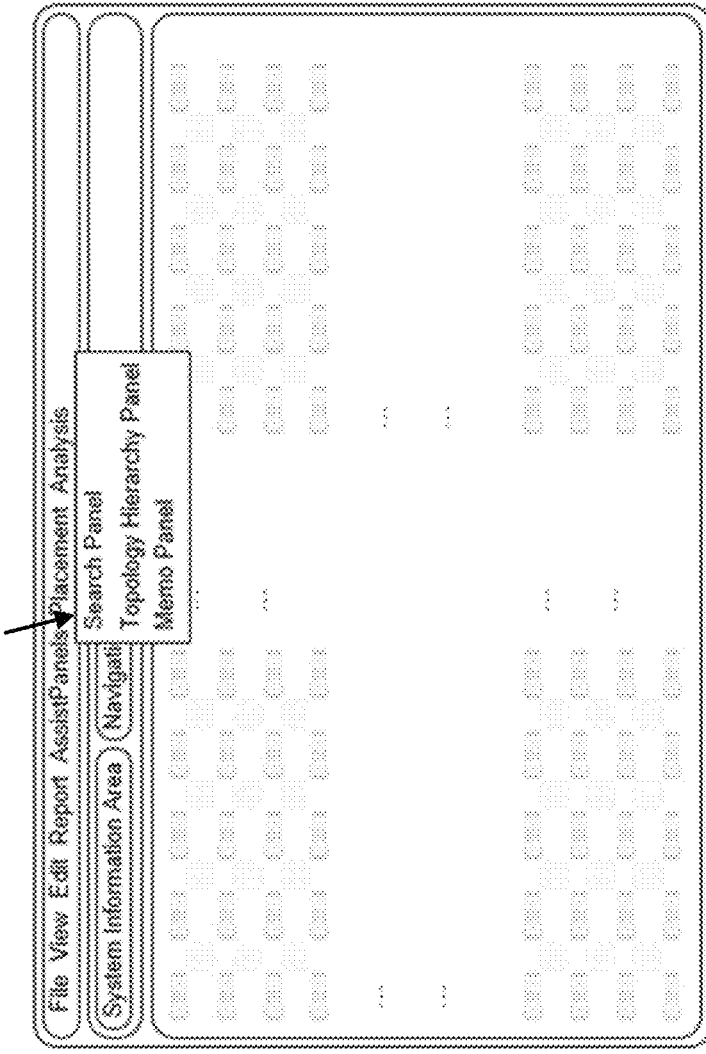

FIG. 20 presents Assist Panels functions or commands GUI object 2005 provided by the "AssistPanels" menu item. The list of commands includes "Search Panel", "Topology Hierarchy Panel", and "Memo Panel". The three user interface elements presented on the display upon receiving respective commands are presented as AssistPanel 2010 in FIG. 20. The Search Panel command displays Search Panel 2015, the Topology Hierarchy Panel command displays Topology Hierarchy Panel 2020, and Memo Panel command displays Memo Panel 2025 on the graphical display as shown in FIG. 20.

The search panel 2015 provides functionality to search a GUI object representing a processing element (or a unit) or search a GUI object representing a link among a plurality of processing elements. The "searchUnit" API can take a name, an identifier or other information about the processing element as input and search the current topology for this processing element. The system then changes the main view of the topology and zooms in to the GUI object representing the matched processing element. The "searchRoute" API can take a link or an interconnection route name, a link or an interconnection route identifier or other information about a link or an interconnection route as input and search the current topology for this link. The system then changes the main view of the topology and zooms in to the GUI object representing the matched link in the topology.

The topology hierarchy panel 2020 provides functionality to present hierarchical representation of component or units in the topology. The "expandHierarchyTree" API is invoked when topology hierarchy command is received. The expandHierarchyTree API calculates a tree structure of the topology and displays the tree structure in the topology hierarchy panel 2020. The system includes logic to access the configuration file to determine hierarchy tree structure for processing elements or units in the topology. An example tree structure 2021 is shown in panel 2020 in FIG. 20. In this tree structure, three graphical objects A, B, and C representing processing elements are shown as children of a parent processing element. A graphical object labeled "root" represents the parent processing element in the hierarchical graph structure. Processing element "B" has two child processing elements shown as graphical objects labeled as B1 and B2. The display of the AssistPanel 2010 updates to display view of the hierarchical structure when the expandHierarchyTree API is executed.

The memo panel 2025 provides the functionality to display graphical objects representing current memos on the AssisPanel. The "listMemo" API is invoked when Memo Panel command is received. When the "listMemo" API is called, the system collects current memos on the main view of the graphical display and displays the memos as graphical objects in the AssisPanel 2010. A user can interact with the graphical objects displayed on the graphical interface representing memos. When the user selects a memo (e.g., by clicking on the graphical object representing the corresponding memo), the system zooms out and changes the main view of the display to the selected memo in the display. The system can zoom in to the graphical object representing the selected memo.

Figure 21:
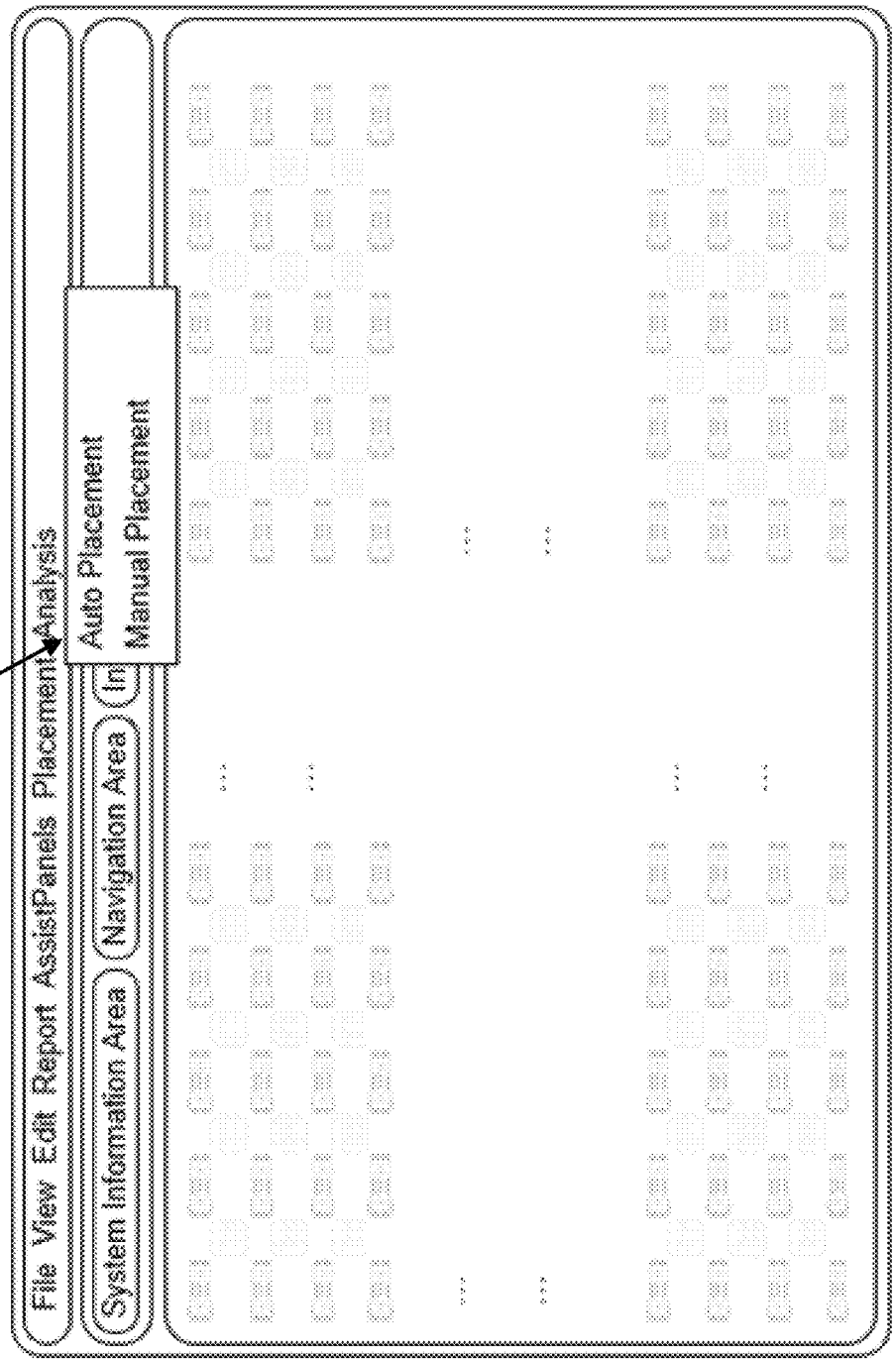
FIG. 21 presents a Placement functions drop down GUI menu provided by the system for editing the topology of a reconfigurable data processor.

FIG. 21 presents Placement functions or commands drop down GUI menu 2105 provided by the "Placement" menu item. The list of commands includes "Auto Placement", and "Manual Placement". Auto placement uses heuristics based on the connectivity of the graph to determine the locations (hardware assets) to which logical nodes in the application graph should be placed. This can occur as a result of manual modification of the application graph represented by changes to the configuration file (for example, adding or deleting nodes in the application graph). Similarly, manual placement enables a user to change the hardware asset assigned to a node in the compute graph by using the GUI to move the graph node bound to a hardware asset (PCU or PMU) on the screen to a new hardware asset. The configuration file may be rewritten at the conclusion of an automatic or manual placement update.

Figure 22:
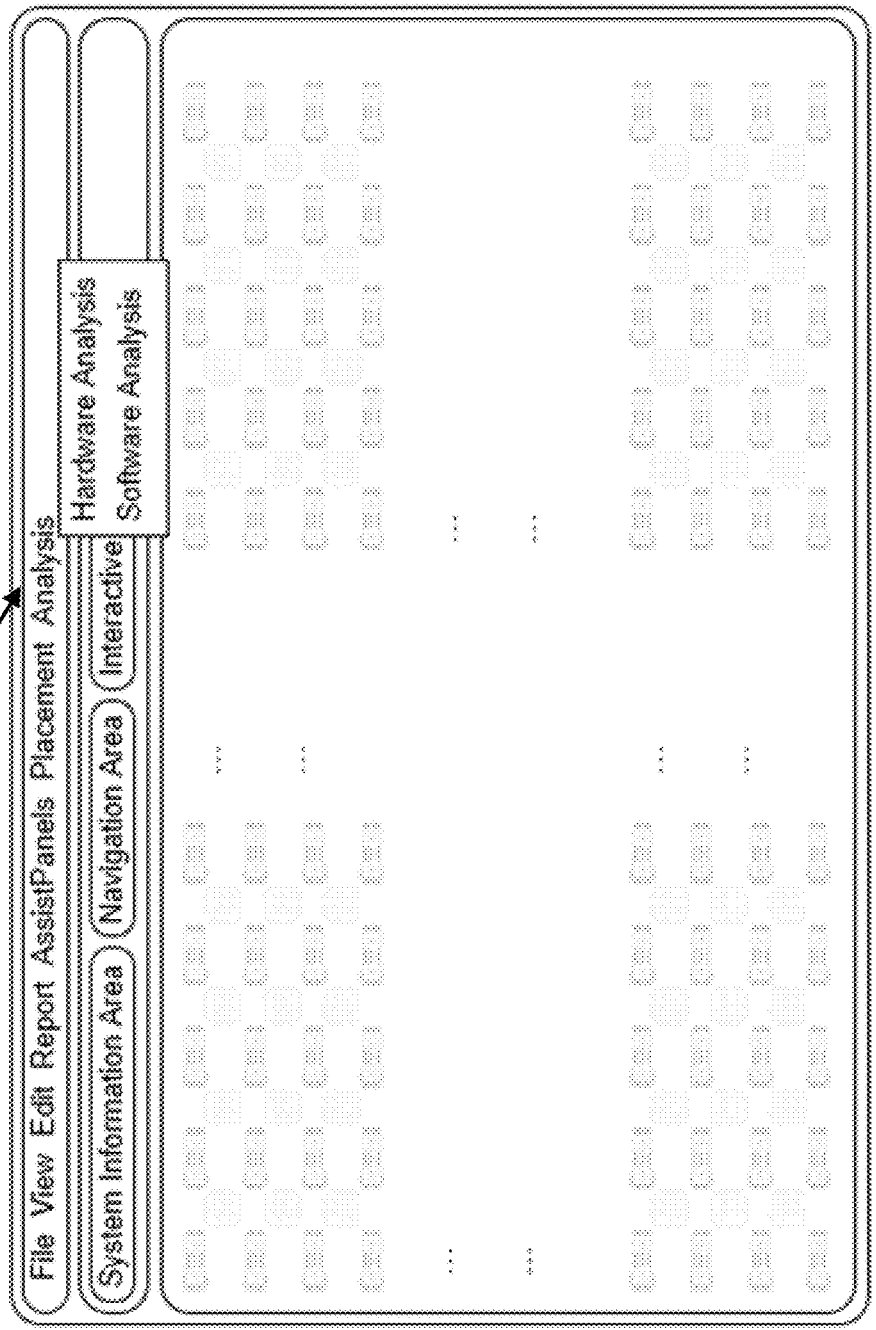
FIG. 22 presents an Analysis functions drop down GUI menu provided by the system for editing the topology of a reconfigurable data processor.

FIG. 22 presents Analysis functions or commands drop down GUI menu 2205 provided by the "Analysis" menu item. The list of commands includes "Hardware Analysis", and "Software Analysis". Hardware and software analysis are both related to performance analysis or performance evaluation of a topology.

Hardware analysis command can invoke a hardware analysis API which causes the system to present hardware errors or hardware issues on the graphical display. For example, the system can highlight a graphical object representing a data link or an interconnection route or change the color of a graphical object representing a link or an interconnection route between two processing elements to show that no data is passing through this data connection. The user can then perform debugging to identify issues in the topology. The hardware analysis causes display or identification of hardware errors in the topology. The system can be connected to a test board comprising the reconfigurable data processor. The results from the test board can be received by the tool for further analysis and display. The system can display the results on the graphical display with overlays or highlight GUI objects representing processing elements or units in the hardware to indicate hardware errors.

Software analysis can identify performance issues or non-hardware issues. For example, software analysis command can invoke software analysis API which causes the system to present performance issues such as a traffic congestion in a switch which can cause data to take more time to reach the destination. The system can highlight GUI objects representing components or units causing performance issues such as a switch with traffic congestion. The system can be connected to a simulation system that can simulate editing a configuration of a graph executable on a set of configurable assets of a reconfigurable data processor. The results from the simulation system can be received by the tool which can display the results on the graphical display with overlays. The system can also highlight GUI objects representing processing elements or units in the hardware to indicate performance issues or errors.

Figure 24:
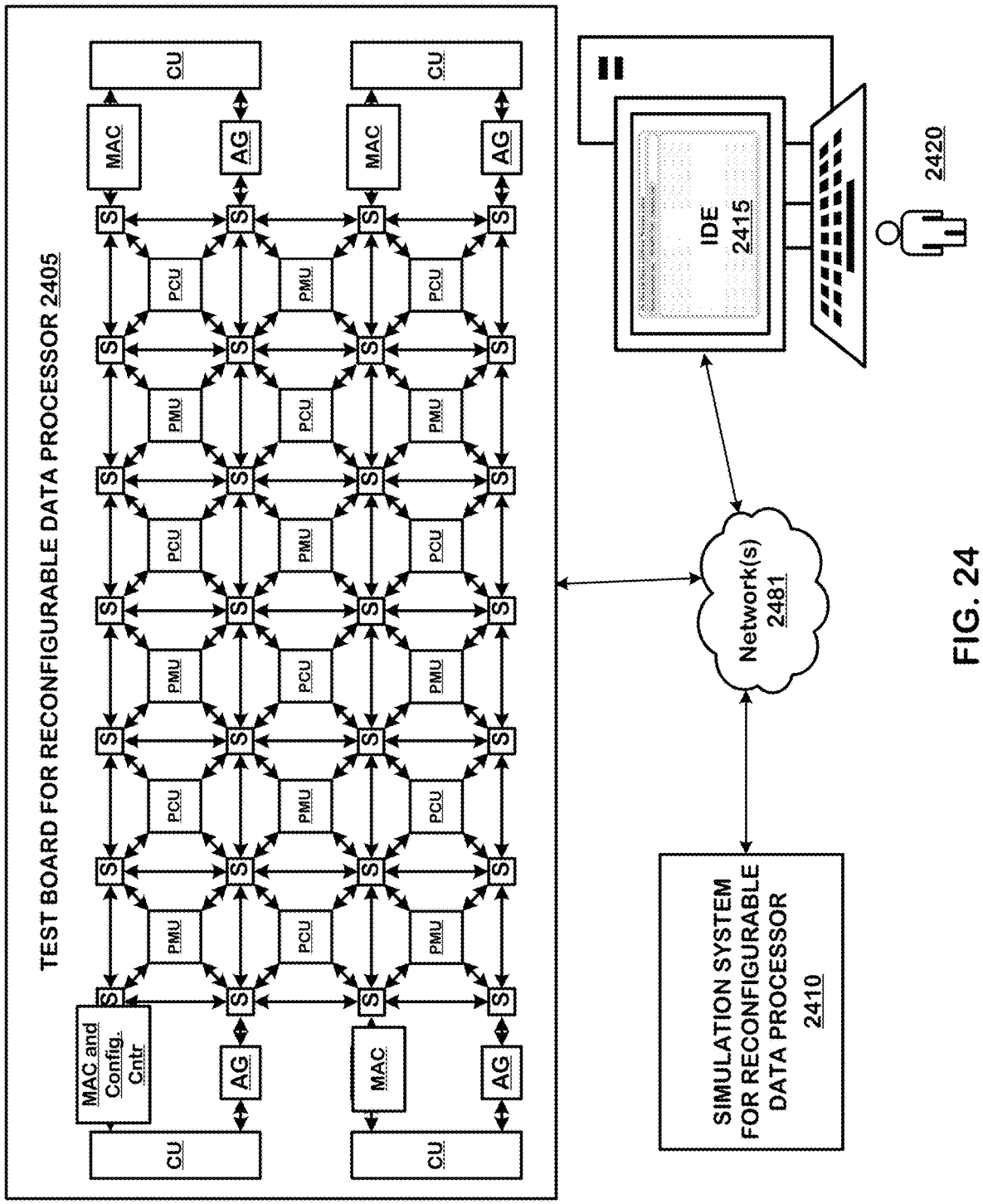
FIG. 24 presents a system diagram illustrating an environment in which the system for editing the topology of reconfigurable data processors can be used.

The technology disclosed provides a window for the users to view the hardware and software issues for a given topology. The system can support both simulation type analysis and can also report issues when topology is deployed to hardware. FIG. 24 presents an example environment in which a user 2420 can use the system 2415 for editing a configuration of a graph executable on a set of reconfigurable assets of a reconfigurable data processor. The user can view and provide commands on an integrated development environment (IDE) or graphical user interface of the system 2415 as shown in FIG. 24. The system can edit the graphical objects representing functions mapped to corresponding processing element and links in a selected portion of the topology. The system 2415 can run simulations or execute the graph on hardware assets. The system can be connected via a network(s) 2481 to a simulation system 2410 and a test board 2405. The system can provide results from the simulation system for reconfigurable data processor 2410. The system can also provide results from hardware execution of a reconfigurable data processor on a test board 2405. The results from simulation and hardware execution can be presented via the graphical user interface (or IDE) to the user 2420 for debugging, design, or analysis purposes. Results of hardware and software (or simulation) analysis can be presented in the overlay areas as shown in FIG. 10B or by updates or changes to GUI objects representing processing elements or hardware assets of the reconfigurable data processor.

Figure 23:
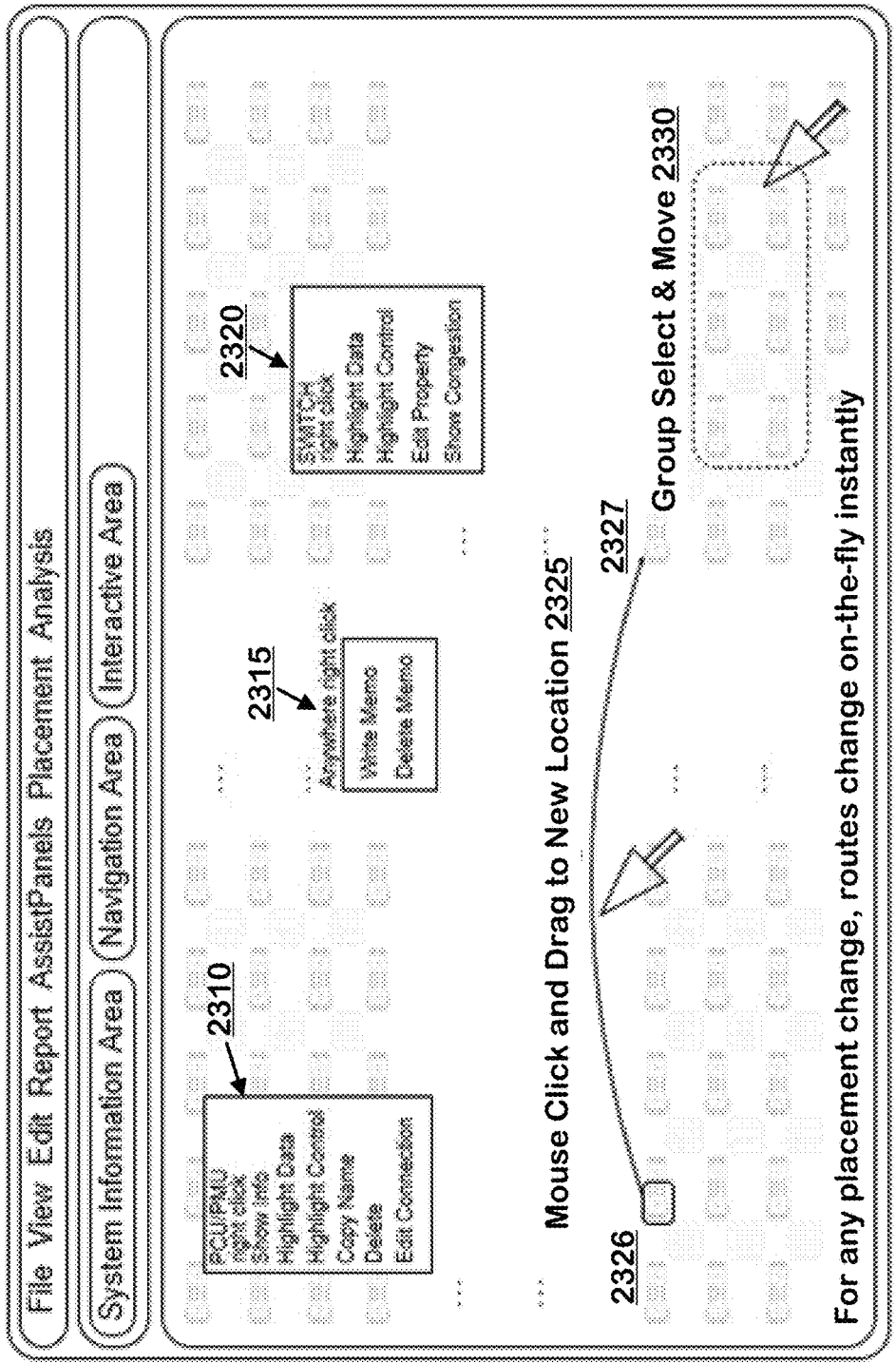
FIG. 23 presents examples of interactions with components in the topology on the main view of the graphical display.

We now present interaction APIs on the main view of the graphical display. FIG. 23 presents examples of main view interactions including clicking on a GUI object representing a processing element (or unit) (2310), clicking anywhere in the main view in graphical display (2315), clicking on GUI object representing a switch (2320), selecting and dragging a GUI object representing a processing element to a new location on the main view (2345), and selecting a group of GUI objects (2330) representing a plurality of processing elements and moving the selected group to a new location on the main view in graphical display.

Clicking on a GUI object representing a processing element (or unit or component) in the topology invokes "clickOnUnits" API. The system can receive, and process left or right clicks as input on a graphical object. When the system receives the input, it provides a list of operations on the graphical object corresponding to the processing element for user selection. For example, as shown in FIG. 23, the system provides a list 2310 including commands "Show Info", "Highlight Data", "Highlight Control", "Copy Name", "Delete", "Edit Connection". These commands are displayed when clicked on a graphical object corresponding to a PCU or a PMU. The system can provide additional commands to the user. The system can receive input from the user and invoke an API or a function related to the selected command in the list.

Clicking anywhere in the main view on graphical display can invoke a "clickAnywhere" API. The system can receive, and process left or right clicks as input, anywhere in the main view on graphical display. When the system receives the input, it provides a list of operations. For example, as shown in FIG. 23, the system provides a list of commands 2315 including "Write Memo", or "Delete Memo". The system can invoke an API for the selected command in the list and provide the user interface to the user to write a new memo or provide a dialog box to the user to delete one or more currently saved memos.

Clicking on a GUI object representing a switch in the topology can invoke a "clickOnSwtiches" API. The system can receive, and process left or right clicks as input on a GUI object representing a switch in the topology. When the system receives the input, it provides a list of operations related to the switch for user selection. For example, as shown in FIG. 23, the system provides a list of commands 2320 including, "Highlight Data", "Highlight Control", "Edit Property", "Show Congestion". The system can invoke an API for the selected command and provide a user interface for further actions. The system can also provide results from executing the selected command by updating the graphical display.

Clicking on a GUI object representing a link or an interconnection route in the topology invokes "clickOnRoutes" API. The system can receive, and process left or right clicks as input on GUI object representing the link. The system can provide a list of operations on link or interconnection routes for user selection. The system can receive and process user's selection and provide output accordingly. For example, the system can show a link or an interconnection route information or highlight GUI object representing a link or an interconnection route, etc.

The system provides functionality to process click (or select) and drag of a GUI object representing a processing element (or a unit or a component) in the reconfigurable data processor to a new location in the graphical display. For example, an arrow labeled 2325 in FIG. 23 shows selection (or clicking) and dragging of a GUI object representing a processing element from an initial location 2326 to a destination location 2327. Clicking (or selecting) and dragging (or moving) of GUI objects representing processing elements in the topology invokes "selectAndMoveUnit" API. A user can click (or select) the GUI object representing a processing element and then drag this GUI object by moving the mouse or any other pointing device from an initial position to a destination position and release (or drop) the selected GUI object on the main view in the graphical display.

The drag and drop or moving of a graphical object can launch the procedure to update the configuration of the graph executable on a set of configurable assets or a reconfigurable data processor. The system interprets the drag and drop or moving of graphical objects to change the topology including the mapping of corresponding function. After the drag and drop of the graphical object representing a processing element, the system can launch the procedure to update the configuration file to implement the change to the topology to provide an updated topology. The updated topology can include updated mapping of functions to processing elements. In addition, the system can also launch analysis tools prior to the user committing the drag and drop of the processing element. The analysis tools might compute the new expected performance, analyze overlapping routes, or provide any other analysis relevant to evaluating the advantages or disadvantages of moving the object as specified by the user. The results of the analysis may be displayed on the main panel, or in a pop-up panel or other GUI element as appropriate.

Following the update to mapping of functions to processing elements, the system calls "re-routeAPI" to update the links or interconnection routes between the processing elements to reflect the updated mapping from the source processing element to the target processing element. The system includes logic to animate re-routing of the link to the destination location. The GUI object representing the processing element is updated on the main view along with updates to GUI objects representing links that are changed as a result of this change of mapping. The system can show an animation illustrating movement of the selected GUI object representing the unit from the source position to the destination position and animate re-routing of graphical objects corresponding to re-routed link to the destination location.

The system provides functionality to process click (or select) and drag to move a GUI object representing a link or an interconnection route from one location in the graphical display to another (or a new) location. Clicking (or selecting) and dragging of GUI object representing a link between two processing elements invokes "selectAndMoveRoute" API. A user can click (or select) on a pin-point location of GUI object representing a link and then drag this GUI object by moving the mouse or any other pointing device from an initial position to a destination position on the graphical display. The user can release (or drop) the selected route on a desired destination location in the main view in the graphical display. The system includes logic to update the configuration file to implement the change to the topology. The updated configuration file includes re-routing of the link between the processing elements. The configuration file therefore stores the updated topology including updated mapping of functions to processing elements reflecting changes to GUI objects representing the link or interconnection route. The system moves the GUI object representing the selected link from the initial (or source) position to the destination position and updates the main view graphical display of the topology accordingly. The system can show an animation illustrating movement of the GUI object representing the selected link from the initial position to the destination position and update the main view graphical display accordingly. The system can also perform consequential updates to other units or interconnection routes that are impacted by the move and update their respective GUI objects.

The feature to move links between processing elements can be used to solve data congestion problems to improve performance. The system also includes logic to redraw GUI objects representing the moved link or interconnection routes by automatically adjusting existing data or control lanes on the destination switch and use different colors to represent GUI object representing multiple data lanes passing through the same switch. The system also includes logic to automatically position GUI object representing data lanes of separate links at a distance from each other when these pass through same switches so that it is easier for visualization.

The system provides a group selection and move functionality enabling the users to apply drag and drop operations to a group of GUI objects representing plurality of processing elements or units of the reconfigurable data processor. The user's selection of more than one GUI objects representing processing elements invokes a "group" API. User's selection of GUI objects can be passed to the system as a list of GUI objects or the user can select multiple GUI objects representing units by clicking (or selecting) on the GUI objects one by one. The user can also select multiple GUI objects representing units at once by using a mouse or a pointing device. The system can assign group information such as a group identifier or a group name to the selected and grouped processing elements. The system can indicate grouped processing elements by updating the graphical display to show GUI objects representing processing elements in the group inside a boundary as shown by a label 2330 on the main view in FIG. 23.

The system provides functionality to move the GUI objects representing grouped processing elements from an initial or source location on the graphical display to a destination location on the graphical display. The group move operation is similar to the unit move operation described above. Moving a GUI object representing a group of processing elements invokes "moveGroup" API. The user can move the GUI object representing a group of processing elements by selecting and dragging the group to a new position on the graphical display. The system accesses the configuration file and applies changes to processing elements in the group. The system reflects these changes by moving the GUI objects representing grouped processing elements to the destination position on the main view. The topology is updated to map the functions to processing elements at the destination. The main view graphical display changes by moving the group identifier or group boundary from source location to destination location on the graphical display. Similar to the unit move operation described previously, the system may automatically invoke analysis tools to evaluate the benefits of performing the group move suggested by the user, and display results in a pop-up window or other GUI element as appropriate.

The group move operation is followed by invoking of "re-routeAPI". The re-routeAPI can be invoked either moving of GUI object representing one processing unit or a group of processing elements to a new position on the graphical display. The re-routeAPI can also be invoked by selecting and moving a GUI object representing a link to a new position on the graphical display. The system recalculates new routes according to the routing algorithm either defined by the user (i.e., a customized routing algorithm) or pre-defined routing algorithms. The system displays updated links on the main view by updating the respective GUI objects.

FIGS. 25A to 26B present an example of changes in a configuration file as a result of optimizations in a topology loaded from an initial configuration file. FIG. 25A presents an example configuration file 2510 that defines an initial configuration of a topology. The configuration file includes row-wise and column-wise locations of processing elements PCU A, PCU B, PMU A and PMU B, respectively (2530). The configuration can also include orientations or directions of routes or links between graphical objects representing processing elements. For example, a first connection configuration 2520 indicates that the data traffic from PCU A to PMU A is to be routed vertically. A second connection configuration 2525 indicates that the data traffic from PCU B to PMU B is to be routed horizontally. The configuration file 2510 can be loaded to the system 2415 for editing and optimizing topology.

Figure 25B:
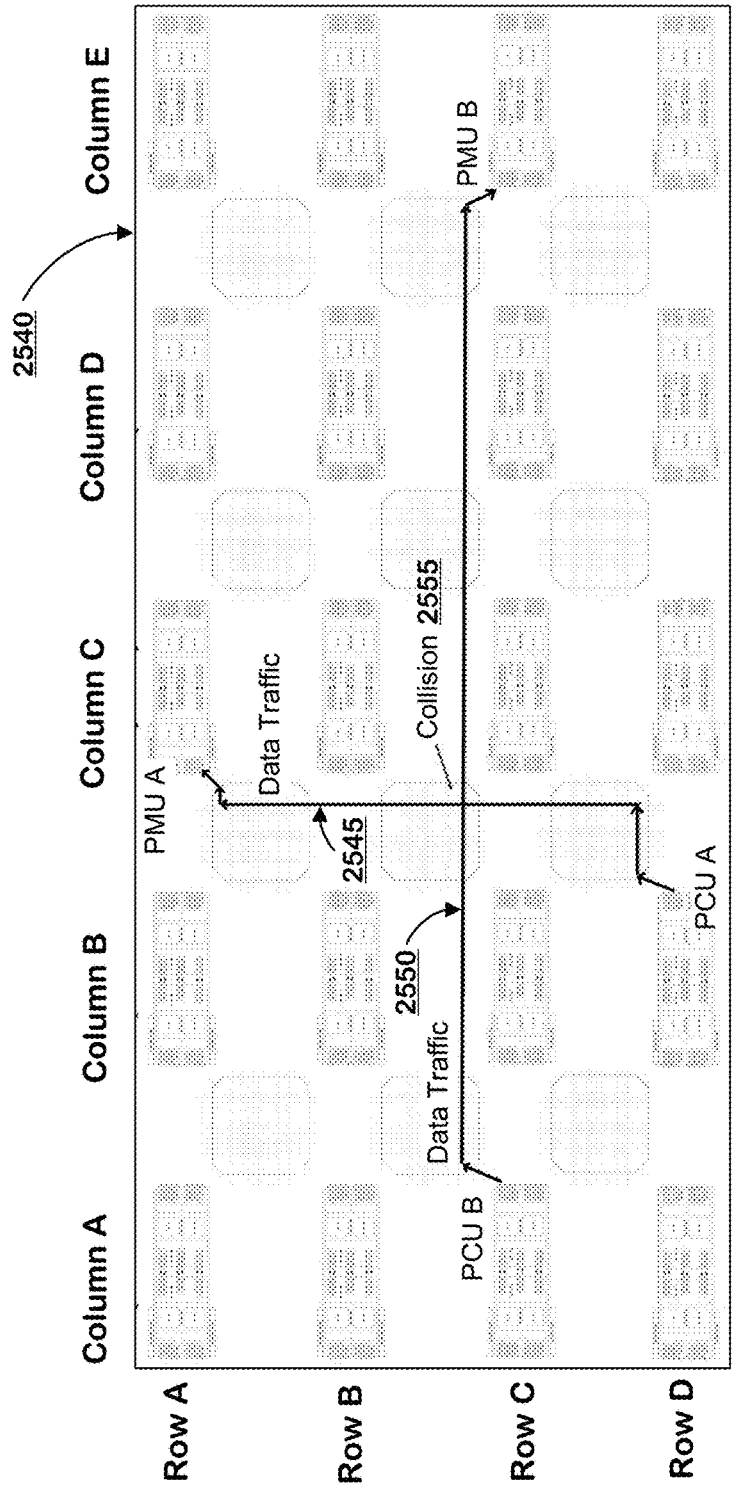
FIG. 25B is the topology loaded from the configuration file of FIG. 25A and displayed on a graphical user interface.

FIG. 25B shows the topology 2540 defined by configuration file 2510. When the configuration file 2510 is loaded into the system 2415, it displays the topology 2540 on graphical user interface. The GUI objects representing four processing elements or units 2530 are shown in respective row-wise and column-wise locations in the initial configuration 2510. The connections 2520 and 2525 in the initial configuration file are illustrated as graphical objects 2545 and 2550, respectively in the topology in FIG. 25B. The data traffic routes 2545 and 2525 collide at a location 2555 as indicated on the user interface.

Figure 26A:
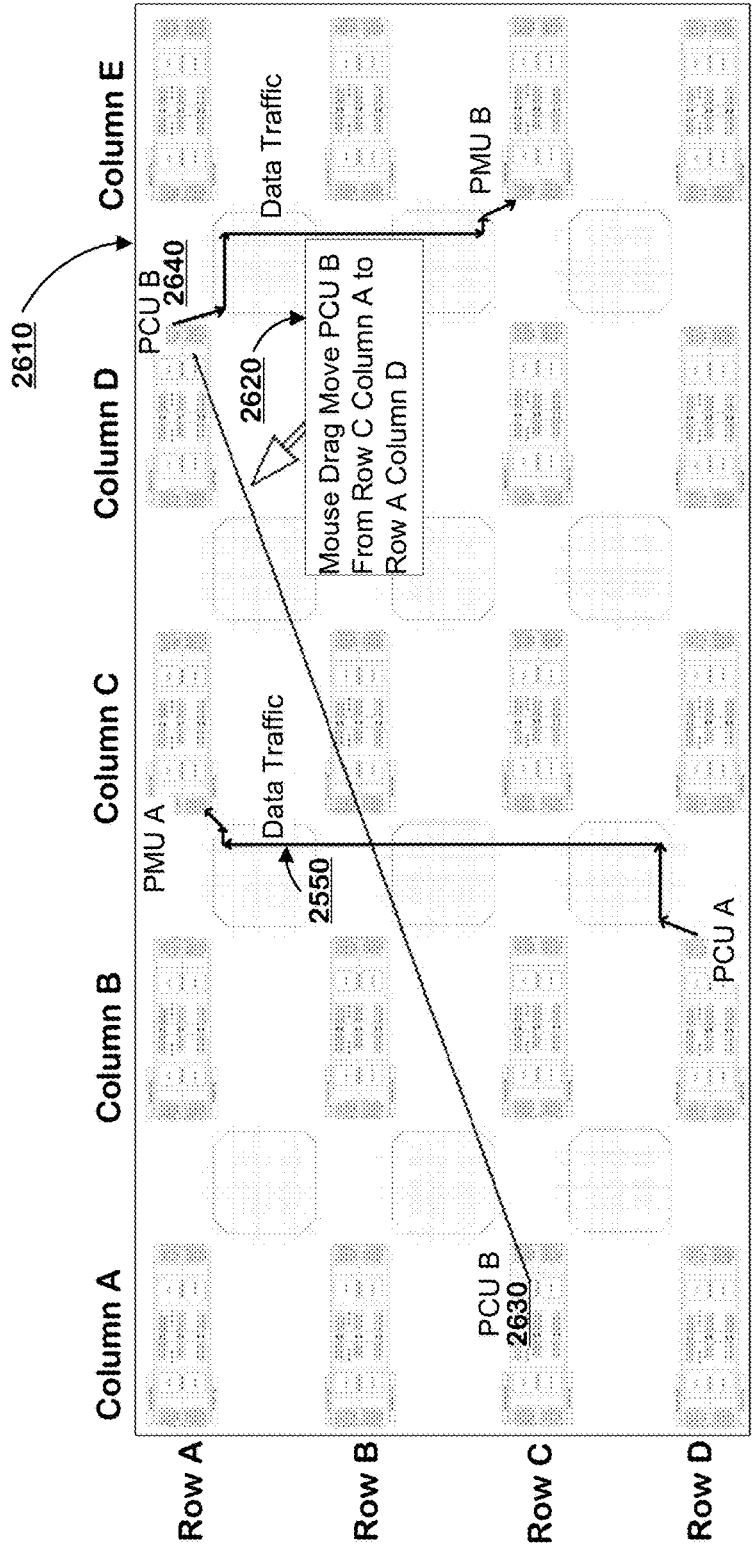
FIG. 26A illustrates optimization of the topology of FIG. 25B by selecting and moving a graphical object from an initial location to a destination location on the graphical user interface.

FIG. 26A illustrates a topology 2610 after changes to the initial topology 2540 using the system for editing and optimizing topology 2415. The graphical object representing processing element PCU B is moved from location 2630 at row C, column A to a new location 2640 at row A and column D. The movement can be performed by using a mouse to select graphical object at location 2630 and dragging and dropping the graphical object at location 2640 as indicated in a box 2620. The system can detect this movement of the graphical object and update placement of the functionality of processing element PCU B from the location 2630 to the location 2640. The topology optimization system 2415 connects the graphical object representing processing element PCU B at new location 2640 to graphical object representing PMU B using a route which passes vertically through two switches.

When the system detects this movement (drag and drop) of graphical object, it launches a procedure to update the configuration file containing the initial configuration to implement the change to the topology. The system then displays the updated topology including change in placement of the corresponding function to processing element at the destination 2640.

FIG. 26B shows updates to the initial configuration 2510 as a result of the movement of graphical object from location 2630 to location 2640. Two elements of the initial configuration file are updated as a result of optimization in the initial topology. The first change is indicated by a label 2670 illustrating that the connection from PCU B to PMU B for data traffic connects the two elements "vertically" which is different from the initial configuration. The second change is indicated by a label 2675 illustrating the unit PCU B is now positioned at row A, column D corresponding to location 2640 which is different from the location 2630 of unit PCU B in the initial configuration. Therefore, the optimization system automatically applies updates to the configuration file when changes are detected to mapping of functions to processing elements or links. The system can then load the updated topology using the updated configuration and display the updated topology.

Figure 27:
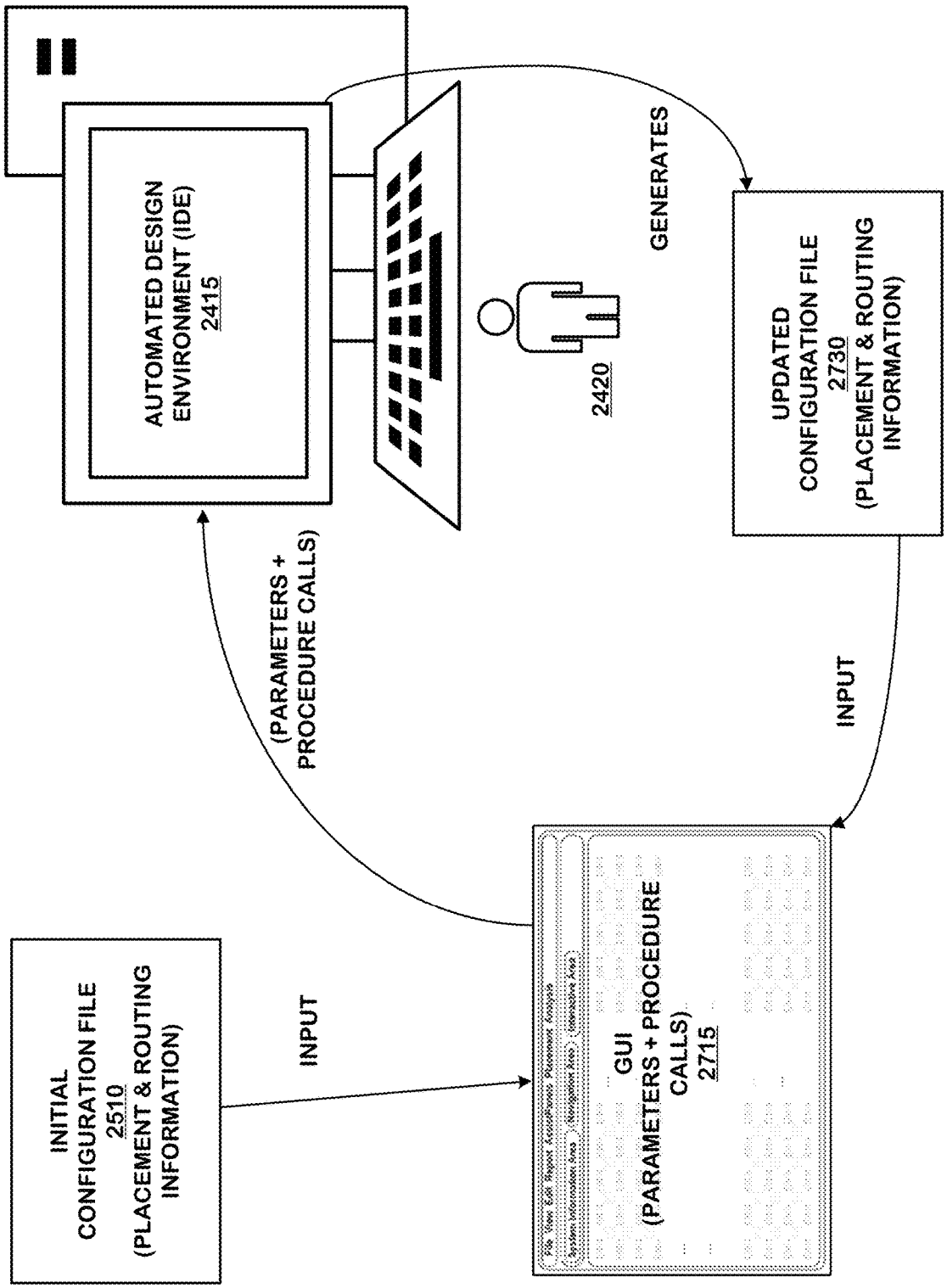
FIG. 27 presents a system diagram illustrating an automated design environment that can consume parameters and procedure calls from graphical user interface to generate an updated configuration file.

FIG. 27 presents a system diagram in which the technology disclosed can be used to perform various types of analyses and invoke other processes on the configuration file from the graphical user interface (GUI) 2715. The initial configuration file 2510 can be given as input to the GUI 2715. An example initial configuration file is presented in FIG. 25A that can include placement and routing information. The GUI 2715 provides procedure calls and parameters for different types of analyses and performance improvements or optimizations to a topology loaded from the initial configuration file.

The system of FIG. 27 also includes an automated design environment (or integrated design environment or IDE) 2415 which can take as input, the parameters and procedure calls from the GUI 2715 to perform the different types of analyses and performance improvements to the topology loaded from the initial configuration file. The analyses and other processes can be invoked on the initial configuration file or as a result of proposed or committed changes to the configuration file. The changes can be performed automatically or as a result of input from a user. Some examples of analyses are presented below.

The system can include logic to compute or recompute the cost of the placement in the updated topology. Cost can represent a feature of the graph defined. The cost can represent a value calculated by one or more procedures comparing two or more topologies. Examples of such procedures include a procedure to compare critical path timings or latency, a procedure to compare the number of configurable units required, a procedure to compare power consumption, etc. The cost can be generated by a synthesis or compiler tool, such as a timing analysis tool and a placement.

The system can include logic to detect user input identifying a graphical object in the graphical representation representing a function placed at a corresponding processing element or link. The system can then launch a procedure to change the placement of the corresponding function in the topology. The system can include logic to launch the procedure to update the configuration file to implement the change to the topology to provide an updated topology. The user input can include a drag and drop gesture of at least one graphical object representing a function placed at a corresponding processing element or link from the corresponding processing element or link to a location on the graphical representation corresponding to another processing element or link. The system can launch a procedure for computing or recomputing the cost of the placement.

The system can include logic to detect user input identifying a graphical object in the graphical representation representing a function placed at a corresponding processing element or link. The system can then launch a procedure to change the placement of the corresponding function in the topology. The system can include logic to launch the procedure to update the configuration file to implement the change to the topology to provide an updated topology. The user input can include an interaction such as clicking or pressing a user interface element. The system can launch a procedure for predicting or simulating the impact on performance of a placement. The impact on the performance can be presented as comparison of cost of placement in the updated topology. It can also be presented by generating a new graph and re-running the graph on the RDU, gathering the new results, and presenting them to the user. The placement can be checkpointed, and replayed or undone to enable the user to experiment with various alternative placements, iterating and finally selecting one among the alternatives investigated.

The system can include logic to detect user input identifying a graphical object in the graphical representation representing a function placed at a corresponding processing element or link. The system can then launch a procedure to change the placement of the corresponding function in the topology. The system can include logic to launch the procedure to update the configuration file to implement the change to the topology to provide an updated topology. The user input can include an interaction such as clicking or pressing a user interface element. The system can launch a procedure to compute alternative placements with the same or better cost, and display alternative placements as a list.

Examples of other processes that can be invoked from the graphical user interface 2715 are presented below.

The system can include logic to detect user input identifying a graphical object in the graphical representation representing a function placed at a corresponding processing element or link. The system can then launch a procedure to change the placement of the corresponding function in the topology. The system can include logic to launch the procedure to update the configuration file to implement the change to the topology to provide an updated topology. The user input can include an interaction such as clicking or pressing a user interface element such as one or more graphical objects representing a function placed at a corresponding processing element or link. The system can launch a procedure to add or delete processing elements or links associated with the selected graphical objects from the graph.

The system can include logic to detect user input identifying a graphical object in the graphical representation representing a function placed at a corresponding processing element or link. The system can then launch a procedure to change the placement of the corresponding function in the topology. The system can include logic to launch the procedure to update the configuration file to implement the change to the topology to provide an updated topology. The user input can include an interaction such as clicking or pressing a user interface element such as one or more graphical objects representing a function placed at a corresponding processing element. The system can launch a procedure to re-optimize the latency of compute nodes associated with the selected graphical objects by adjusting par factors and resource allocations.

The system can include logic to detect user input identifying a graphical object in the graphical representation representing a function placed at a corresponding processing element or link. The system can then launch a procedure to change the placement of the corresponding function in the topology. The system can include logic to launch the procedure to update the configuration file to implement the change to the topology to provide an updated topology. The user input can include an interaction such as clicking or pressing a user interface element. The system can launch a procedure to store or display a human-readable log of the changes made during the GUI session for possible replay or undo later.

The automated design environment 2415 can generate updated configuration file 2730. The updated configuration file can reflect changes in topology and/or reflect changes due to compilation or recompilation functions. The updated configuration file can include improvements to the design of the topology (or graph) being compiled and can be provided to the GUI for display to the user.

Clauses

A technology is described which uses buffers to efficiently stream data between processors on a same processing node and on different processing nodes, which can be particularly applied to processors such as Central Processing Unit (CPUs), Graphics Processing Units (GPUs), Field Programmable Gate Arrays (FPGAs), Coarse-Grained Reconfigurable Architectures (CGRAs), Application-Specific Integrated Circuits (ASICs), Application Specific Instruction-set Processor (ASIP), and Digital Signal Processors (DSPs). The technology disclosed implements efficient distributed computing by allowing accelerators (e.g., reconfigurable processors) attached to separate hosts to directly communicate with each other via buffers.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

1. A system for editing a configuration of a graph executable on a set of configurable assets of a reconfigurable data processor, the configurable assets including a plurality of processing elements having locations on an integrated circuit or on integrated circuits, and links among the plurality of processing elements, comprising:

a processor, including a display and memory accessible by the processor, the memory including instructions executable to:

read at least portions of a configuration file in memory, the configuration file including a topology that places functions of the graph at processing elements and links having relative positions among the plurality of processing elements and links;

display a graphical interface including graphical objects representing functions placed at corresponding processing elements and links arranged according to relative positions in a selected portion of the topology;

detect user input identifying a graphical object in the graphical representation representing a function placed at a corresponding processing element or link, and a procedure to change the placement of the corresponding function in the topology;

launch the procedure to update the configuration file to implement the change to the topology to provide an updated topology; and logic to update the graphical representation based on the updated topology including updated placement of functions to processing elements in the graph that comprises functions.

2. The system of clause 1, wherein the plurality of processing elements of the reconfigurable data processor include compute and memory units.

3. The system of clause 1, further comprising logic to receive data indicating data traffic on the links from simulation or execution of the graph, and to generate graphical objects for display with the selected portion of the topology which represent a characteristic of the data traffic.

4. The system of clause 1, further comprising logic to generate hardware error information to indicate hardware failure, indicating error in at least one processing element or link in the selected portion of the topology.

5. The system of clause 1, further comprising logic to generate a data hang notice for the topology to indicate at least one nonresponsive processing element in the plurality of processing elements of the reconfigurable data processor.

6. The system of clause 1, wherein the user input in the graphical representation includes a drag and drop gesture of at least one graphical object representing a function placed at a corresponding processing element or link from the corresponding processing element or link to a location on the graphical representation corresponding to another processing element or link.

7. The system of clause 1, wherein the user input in the graphical representation includes a grouping gesture of two or more graphical objects representing functions placed at corresponding processing elements in the plurality of processing elements to assign the processing elements to a group and update the graphical representation to indicate the grouping.

8. The system of clause 1, further comprising:

logic to receive an input to determine an alternative topology corresponding to the topology in the configuration file, the alternative topology including an alternative placement that places functions of the graph at processing elements and links having relative positions among the plurality of processing elements and links, wherein the alternative topology places functions of the graph on at least one processing element and at least one link not present in the topology; and logic to calculate a cost of alternative placement in the alternative topology and presenting the cost of the alternative topology along with a cost of the topology to the user for selecting a topology.

9. The system of clause 8, further comprising:

logic to receive an input to determine a plurality of alternative topologies including a plurality of alternative placements corresponding to the topology in the configuration file; and logic to calculate the costs of the plurality of alternative placements in the plurality of alternative topologies and presenting the respective costs of the plurality of alternative topologies along with the cost of the topology to the user for selecting a topology.

10. The system of clause 8, further comprising:

logic to re-run the graphical representation based on the alternative topology including updated placement of functions to processing elements in the graph that comprises functions; and logic to use difference between performances of the alternative topology and the topology for selecting the topology.

11. The system of clause 1, further comprising:

logic to receive an input including an identifier of a processing element;

a procedure to search the topology using the identifier and logic to identify a matched processing element; and logic to zoom in to display a graphical object representing the matched processing element on the display.

12. The system of clause 1, further comprising:

logic to receive an input including an identifier of a link;

a procedure to search the topology using the identifier and logic to identify a matched link; and logic to zoom in to display a graphical object representing the matched link on the display.

13. The system of clause 1, further comprising:

logic to display a list of operations for a graphical object, on the display, related to a processing element in the plurality of processing elements represented by the graphical object in the graphical interface wherein the operations can include any one of displaying processing element information, highlighting the graphical object representing the processing element, or editing processing element property.

14. The system of clause 1, further comprising:

logic to display a list of operations for a graphical object, on the display, related to a link between two processing elements in the graphical representation wherein the operations can include anyone of displaying the link information, highlighting the graphical object representing the link, or editing the link property.

15. The system of clause 6, wherein the user input in the graphical representation includes a drag and drop gesture of at least one graphical object representing a function placed at a corresponding first processing element from the corresponding first processing element to a destination location on the graphical representation corresponding to a second processing element, the system further comprising:

logic to place the function at the second processing element on the destination location and animate movement of the graphical object to the destination location on the graphical representation corresponding to the second processing element;

logic to re-route the link to the second processing element at the destination location; and logic to display graphical object representing re-routed link to the second processing element at the destination location.

16. The system of clause 7, further comprising:

logic to select the graphical object representing the group of graphical objects corresponding to processing elements in the group and dragging the graphical object representing the group from a location of corresponding processing elements in the group to a destination location on the graphical representation corresponding to another group of processing elements;

logic to animate movement of the graphical object representing the group to the destination location;

logic to re-route the links to processing elements in the group of processing elements at the destination location; and logic to display the graphical representations of re-routed links to the graphical objects representing the group at the destination location.

17. The system of clause 1, wherein the user input in the graphical representation includes a drag and drop gesture of at least one graphical object representing a function placed at a corresponding first link from the corresponding first link to a destination location on the graphical representation corresponding to a second link, the system further comprising:

logic to animate re-routing of the first link to the destination location corresponding to the second link; and logic to display the graphical object corresponding to the second link at the destination location.

18. A computer-implemented method of editing a configuration of a graph executable on a set of configurable assets of a reconfigurable data processor, the configurable assets including a plurality of processing elements having locations on an integrated circuit or on integrated circuits, and links among the plurality of processing elements, the method including:

reading at least portions of a configuration file in memory, the configuration file including a topology that places functions of the graph at processing elements and links having relative positions among the plurality of processing elements and links;

displaying a graphical interface including graphical objects representing functions placed at corresponding processing elements and links arranged according to relative positions in a selected portion of the topology;

detecting user input identifying a graphical object in the graphical representation representing a function placed at a corresponding processing element or link, and a procedure to change the placement of the corresponding function in the topology;

launching the procedure to update the configuration file to implement the change to the topology to provide an updated topology; and updating the graphical representation based on the updated topology including updated placement of functions to processing elements in the graph that comprises functions.

19. The method of clause 18, wherein the plurality of processing elements of the reconfigurable data processor include compute and memory units.

20. The method of clause 18, further including:

receiving data indicating data traffic on the links from simulation or execution of the graph, and generating graphical objects for display with the selected portion of the topology which represent a characteristic of the data traffic.

21. The method of clause 18, further including:

generating hardware error information to indicate hardware failure, indicating error in at least one processing element or link in the selected portion of the topology.

22. The method of clause 18, further including:

generating a data hang notice for the topology to indicate at least one nonresponsive processing element in the plurality of processing elements of the reconfigurable data processor.

23. The method of clause 18, wherein the user input in the graphical representation includes a drag and drop gesture of at least one graphical object representing a function placed at a corresponding processing element or link from the corresponding processing element or link to a location on the graphical representation corresponding to another processing element or link.

24. The method of clause 18, wherein the user input in the graphical representation includes a grouping gesture of two or more graphical objects representing functions placed at corresponding processing elements in the plurality of processing elements to assign the processing elements to a group and update the graphical representation to indicate the grouping.

25. The method of clause 18, further including:

receiving an input including an identifier of a processing element;

searching the topology using the identifier to identify a matched processing element; and zooming in to display a graphical object representing the matched processing element on the display.

26. The method of clause 18, further including:

receiving an input including an identifier of a link;

searching the topology using the identifier and logic to identify a matched link; and zooming in to display a graphical object representing the matched link on the display.

27. The method of clause 18, further including:

displaying a list of operations for a graphical object, on the display, related to a processing element in the plurality of processing elements represented by the graphical object in the graphical interface wherein the operations can include any one of displaying processing element information, highlighting the graphical object representing the processing element, or editing processing element property.

28. The method of clause 18, further including:

displaying a list of operations for a graphical object, on the display, related to a link between two processing elements in the graphical representation wherein the operations can include anyone of displaying the link information, highlighting the graphical object representing the link, or editing the link property.

29. The method of clause 23, wherein the user input in the graphical representation includes a drag and drop gesture of at least one graphical object representing a function placed at a corresponding first processing element from the corresponding first processing element to a destination location on the graphical representation corresponding to a second processing element, the method further including:

placing the function at the second processing element on the destination location and animating movement of the graphical object to the destination location on the graphical representation corresponding to the second processing element;

re-routing the link to the second processing element at the destination location; and displaying graphical object representing re-routed link to the second processing element at the destination location.

30. The method of clause 24, further including:

selecting the graphical object representing the group of graphical objects corresponding to processing elements in the group and dragging the graphical object representing the group from a location of corresponding processing elements in the group to a destination location on the graphical representation corresponding to another group of processing elements;

animating movement of the graphical object representing the group to the destination location;

re-routing the links to processing elements in the group of processing elements at the destination location; and displaying the graphical representations of re-routed links to the graphical objects representing the group at the destination location.

31. The method of clause 18, wherein the user input in the graphical representation includes a drag and drop gesture of at least one graphical object representing a function placed at a corresponding first link from the corresponding first link to a destination location on the graphical representation corresponding to a second link, the method further including:

animating re-routing of the first link to the destination location corresponding to the second link; and displaying the graphical object corresponding to the second link at the destination location.

32. A non-transitory computer readable storage medium impressed with computer program instructions to edit a configuration of a graph executable on a set of configurable assets of a reconfigurable data processor, the configurable assets including a plurality of processing elements having locations on an integrated circuit or on integrated circuits, and links among the plurality of processing elements, implement a method comprising:

reading at least portions of a configuration file in memory, the configuration file including a topology that places functions of the graph at processing elements and links having relative positions among the plurality of processing elements and links;

displaying a graphical interface including graphical objects representing functions placed at corresponding processing elements and links arranged according to relative positions in a selected portion of the topology;

detecting user input identifying a graphical object in the graphical representation representing a function placed at a corresponding processing element or link, and a procedure to change the placement of the corresponding function in the topology;

launching the procedure to update the configuration file to implement the change to the topology to provide an updated topology; and updating the graphical representation based on the updated topology including updated placement of functions to processing elements in the graph that comprises functions.

33. The non-transitory computer readable storage medium of clause 32, wherein the plurality of processing elements of the reconfigurable data processor include compute and memory units.

34. The non-transitory computer readable storage medium of clause 32, implementing the method further comprising:

receiving data indicating data traffic on the links from simulation or execution of the graph, and generating graphical objects for display with the selected portion of the topology which represent a characteristic of the data traffic.

35. The non-transitory computer readable storage medium of clause 32, implementing the method further including:

generating hardware error information to indicate hardware failure, indicating error in at least one processing element or link in the selected portion of the topology.

36. The non-transitory computer readable storage medium of clause 32, implementing the method further comprising:

generating a data hang notice for the topology to indicate at least one nonresponsive processing element in the plurality of processing elements of the reconfigurable data processor.

37. The non-transitory computer readable storage medium of clause 32, wherein the user input in the graphical representation includes a drag and drop gesture of at least one graphical object representing a function placed at a corresponding processing element or link from the corresponding processing element or link to a location on the graphical representation corresponding to another processing element or link.

38. The non-transitory computer readable storage medium of clause 32, wherein the user input in the graphical representation includes a grouping gesture of two or more graphical objects representing functions placed at corresponding processing elements in the plurality of processing elements to assign the processing elements to a group and update the graphical representation to indicate the grouping.

39. The non-transitory computer readable storage medium of clause 32, implementing the method further comprising:

receiving an input including an identifier of a processing element;

searching the topology using the identifier to identify a matched processing element; and zooming in to display a graphical object representing the matched processing element on the display.

40. The non-transitory computer readable storage medium of clause 32, implementing the method further comprising:

receiving an input including an identifier of a link;

searching the topology using the identifier and logic to identify a matched link; and zooming in to display a graphical object representing the matched link on the display.

41. The non-transitory computer readable storage medium of clause 32, implementing the method further comprising:

displaying a list of operations for a graphical object, on the display, related to a processing element in the plurality of processing elements represented by the graphical object in the graphical interface wherein the operations can include any one of displaying processing element information, highlighting the graphical object representing the processing element, or editing processing element property.

42. The non-transitory computer readable storage medium of clause 32, implementing the method further comprising:

displaying a list of operations for a graphical object, on the display, related to a link between two processing elements in the graphical representation wherein the operations can include anyone of displaying the link information, highlighting the graphical object representing the link, or editing the link property.

43. The non-transitory computer readable storage medium of clause 37, wherein the user input in the graphical representation includes a drag and drop gesture of at least one graphical object representing a function placed at a corresponding first processing element from the corresponding first processing element to a destination location on the graphical representation corresponding to a second processing element, implementing the method further comprising:

placing the function at the second processing element on the destination location and animating movement of the graphical object to the destination location on the graphical representation corresponding to the second processing element;

re-routing the link to the second processing element at the destination location; and displaying graphical object representing re-routed link to the second processing element at the destination location.

44. The non-transitory computer readable storage medium of clause 38, implementing the method further comprising:

selecting the graphical object representing the group of graphical objects corresponding to processing elements in the group and dragging the graphical object representing the group from a location of corresponding processing elements in the group to a destination location on the graphical representation corresponding to another group of processing elements;

animating movement of the graphical object representing the group to the destination location;

re-routing the links to processing elements in the group of processing elements at the destination location; and displaying the graphical representations of re-routed links to the graphical objects representing the group at the destination location.

45. The non-transitory computer readable storage medium of clause 32, wherein the user input in the graphical representation includes a drag and drop gesture of at least one graphical object representing a function placed at a corresponding first link from the corresponding first link to a destination location on the graphical representation corresponding to a second link, implementing the method further comprising:

animating re-routing of the first link to the destination location corresponding to the second link; and displaying the graphical object corresponding to the second link at the destination location.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system for editing a mapping of functions of a graph to configurable units of a reconfigurable data processor (RDP), the system comprising:

a processor, a display operably coupled to the processor, and memory, accessible by the processor, the memory storing instructions that when executed by the processor implement a method comprising:

obtaining a configuration file that maps a first function of a graph to a first configurable unit of an RDP;

displaying a first graphical object representing the first configurable unit of the RDP and a second graphical object representing a second configurable unit of the RDP in a graphical user interface (GUI), positions of the first graphical object and the second graphical object in the GUI based on a relative physical position of the first configurable unit and the second configurable unit on an integrated circuit;

detecting user input indicating a change in the mapping of the first function from the first configurable unit to the second configurable unit; and updating the configuration file to map the first function of the graph to the second configurable unit of the RDP.

2. The system of claim 1, further comprising the RDP, the RDP including links between configurable units of the RDP, the configurable units of the RDP including compute units, memory units, fused compute and memory units, and/or switches, wherein the RDP has a Coarse-Grained Reconfigurable Architecture (CGRA).

3. The system of claim 1, the GUI comprising a plurality of graphical objects, including the first graphical object and the second graphical object, the RDP comprising a plurality of configurable units, including the first configurable unit and the second configurable unit, and a plurality of links between pairs of configurable units of the plurality of configurable units, the plurality of graphical objects respectively representing one of one or more configurable units of the plurality of configurable units or one or more links of the plurality of links, the method further comprising:

receiving an identifier of a particular configurable unit of the plurality of configurable units or a particular link of the plurality of links;

determining a particular graphical object representing the particular configurable unit or particular link; and zooming in on the particular graphical object in the GUI.

4. The system of claim 1, the GUI comprising a plurality of graphical objects, including the first graphical object and the second graphical object, the RDP comprising a plurality of configurable units, including the first configurable unit and the second configurable unit, and a plurality of links between pairs of configurable units of the plurality of configurable units, the plurality of graphical objects respectively representing one of one or more configurable units of the plurality of configurable units or one or more links of the plurality of links, the method further comprising:

receiving an identifier of a particular element of the RDP, the particular element being a configurable unit of the plurality of configurable units or a particular link of the plurality of links;

displaying a list of operations in the GUI for particular element, the operations in the list of operations including one or more of:

displaying information related to the particular element, highlighting a particular graphical object of the plurality of graphical objects representing the particular element, or editing a property of the particular element.

5. The system of claim 1, the GUI comprising a plurality of graphical objects, including the first graphical object and the second graphical object, the RDP comprising a plurality of configurable units, including the first configurable unit and the second configurable unit, and a plurality of links between pairs of configurable units of the plurality of configurable units, the plurality of graphical objects respectively representing one of one or more configurable units of the plurality of configurable units or one or more links of the plurality of links, the method further comprising:

obtaining a plurality of functions for the graph from the configuration file, and an initial mapping of the plurality of functions to a first set of configurable units of the plurality of configurable units;

obtaining an alternative mapping of the plurality of functions to a second set of configurable units of the plurality of configurable units, the second set of configurable units having at last one configurable unit not included in the first set of configurable units;

calculating a cost of the alternative mapping; and presenting the cost of the alternative mapping along with a cost of the initial mapping in the GUI.

6. The system of claim 1, the method further comprising:

displaying, in the GUI, a third graphical object representing a first interconnect route, defined in the configuration file, between the first configurable unit and a third configurable unit of the RDP; and after the detecting of the user input:

generating a second interconnect route between the second configurable unit and the third configurable unit;

updating the configuration file to remove the first interconnect route and include the second interconnect route;

removing the third graphical object from the GUI; and displaying a fourth graphical object representing the second interconnect route.

7. The system of claim 6, the method further comprising:
detecting as the user input, a selection of the third graphical object and an indication of a new location in the GUI;
selecting the second configurable unit from a plurality of configurable units in the RDP and/or generating the second interconnect route based on the new location.

8. The system of claim 1, the GUI comprising a plurality of graphical objects, including the first graphical object and the second graphical object, the RDP comprising a plurality of configurable units, including the first configurable unit and the second configurable unit, and a plurality of links between pairs of configurable units of the plurality of configurable units, the plurality of graphical objects respectively representing one of one or more configurable units of the plurality of configurable units or one or more links of the plurality of links, the method further comprising:
detecting as the user input, a grouping gesture covering two or more graphical objects of the plurality of graphical objects to create a group of configurable units, configurable units in the group of configurable units represented by the two or more graphical objects covered by the grouping gesture; and
displaying a third graphical object in the GUI to represent the group of configurable units.

9. The system of claim 8, the method further comprising:
displaying, in the GUI, one or more interconnect graphical objects representing one or more interconnect paths, defined in the configuration file, that connect with configurable units in the group of configurable units;
receiving a selection of the third graphical object, a drag of the third graphical object toward a location of a fourth graphical object representing another group of configurable units of the plurality of configurable units, and a drop of the third graphical object at or near the location of the fourth graphical object;
rerouting the one or more interconnect paths to generate one or more rerouted interconnect paths that connect with configurable units in the another group of configurable units;
updating the configuration file to remove the one or more interconnect paths include one or more rerouted interconnect paths; and
displaying, in the GUI, one or more updated graphical objects representing the one or more rerouted interconnect paths.

10. A non-transitory computer readable storage medium storing computer instructions to edit a mapping of functions of a graph to configurable units of a reconfigurable data processor (RDP), that when executed by a processor implement a method comprising:
obtaining a configuration file that maps a first function of a graph to a first configurable unit of an RDP;
displaying a first graphical object representing the first configurable unit of the RDP and a second graphical object representing a second configurable unit of the RDP in a graphical user interface (GUI), positions of the first graphical object and the second graphical object in the GUI based on a relative physical position of the first configurable unit and the second configurable unit on an integrated circuit;
detecting user input indicating a change in the mapping of the first function from the first configurable unit to the second configurable unit; and updating the configuration file to map the first function of the graph to the second configurable unit of the RDP.

11. The non-transitory computer readable storage medium of claim 10, wherein the RDP includes links between configurable units of the RDP, the configurable units of the RDP include compute units, memory units, fused compute and memory units, and/or switches, and the RDP has a Coarse-Grained Reconfigurable Architecture (CGRA).

12. The non-transitory computer readable storage medium of claim 10, the method further comprising:
receiving hardware error information indicating an error in in a third configurable unit of the RDP; and
displaying a third graphical object representing the error in the GUI.

13. The non-transitory computer readable storage medium of claim 10, the method further comprising:
receiving a hang notice indicating that a third configurable unit of the RDP is unresponsive; and
displaying a third graphical object representing the hang notice in the GUI.

14. The non-transitory computer readable storage medium of claim 10, the method further comprising:
receiving data indicating data traffic in a link between configurable units from simulation or execution of the graph; and
generating and displaying a third graphical in the GUI which represent a characteristic of the data traffic.

15. The non-transitory computer readable storage medium of claim 10, the user input comprising a selection of the first graphical object, a drag of the first graphical object toward a location of the second graphical object, and a drop of the first graphical object at or near the location of the second graphical object.

16. The non-transitory computer readable storage medium of claim 15, the method further comprising animating a movement of the first graphical object toward the location of the second graphical object.

17. The non-transitory computer readable storage medium of claim 10, the method further comprising:
displaying, in the GUI, a third graphical object representing a first interconnect route, defined in the configuration file, between the first configurable unit and a third configurable unit of the RDP; and
after the detecting of the user input:
generating a second interconnect route between the second configurable unit and the third configurable unit;
updating the configuration file to remove the first interconnect route and include the second interconnect route;
removing the third graphical object from the GUI; and
displaying a fourth graphical object representing the second interconnect route.

18. The non-transitory computer readable storage medium of claim 17, the method further comprising presenting an animation in the GUI representing the generating of the second interconnect route.

19. The non-transitory computer readable storage medium of claim 17, the method further comprising:
detecting as the user input, a selection of the third graphical object and an indication of a new location in the GUI;
selecting the second configurable unit from a plurality of configurable units of the RDP and/or generating the second interconnect route based on the new location.

20. The non-transitory computer readable storage medium of claim 10, the GUI comprising a plurality of graphical objects, including the first graphical object and the second graphical object, the RDP comprising a plurality of configurable units, including the first configurable unit and the second configurable unit, and a plurality of links between pairs of configurable units of the plurality of configurable units, the plurality of graphical objects respectively representing one of one or more configurable units of the plurality of configurable units or one or more links of the plurality of links.

21. The non-transitory computer readable storage medium of claim 20, the method further comprising:
   receiving an identifier of a particular configurable unit of the plurality of configurable units or a particular link of the plurality of links;
   determining a particular graphical object representing the particular configurable unit or particular link; and
   zooming in on the particular graphical object in the GUI.

22. The non-transitory computer readable storage medium of claim 20, the method further comprising:
   receiving an identifier of a particular element of the RDP, the particular element being a configurable unit of the plurality of configurable units or a particular link of the plurality of links;
   displaying a list of operations in the GUI for particular element, the operations in the list of operations including one or more of:
      displaying information related to the particular element,
      highlighting a particular graphical object of the plurality of graphical objects representing the particular element, or
      editing a property of the particular element.

23. The non-transitory computer readable storage medium of claim 20, the method further comprising:
   obtaining a plurality of functions for the graph from the configuration file, and an initial mapping of the plurality of functions to a first set of configurable units of the plurality of configurable units;
   obtaining an alternative mapping of the plurality of functions to a second set of configurable units of the plurality of configurable units, the second set of configurable units having at last one configurable unit not included in the first set of configurable units;
   calculating a cost of the alternative mapping; and
   presenting the cost of the alternative mapping along with a cost of the initial mapping in the GUI.

24. The non-transitory computer readable storage medium of claim 20, the method further comprising:
   detecting as the user input, a grouping gesture covering two or more graphical objects of the plurality of graphical objects to create a group of configurable units, configurable units in the group of configurable units represented by the two or more graphical objects covered by the grouping gesture; and
   displaying a third graphical object in the GUI to represent the group of configurable units.

25. The non-transitory computer readable storage medium of claim 24, the method further comprising:
   displaying, in the GUI, one or more interconnect graphical objects representing one or more interconnect paths, defined in the configuration file, that connect with configurable units in the group of configurable units;
   receiving a selection of the third graphical object, a drag of the third graphical object toward a location of a fourth graphical object representing another group of configurable units of the plurality of configurable units, and a drop of the third graphical object at or near the location of the fourth graphical object;
   rerouting the one or more interconnect paths to generate one or more rerouted interconnect paths that connect with configurable units in the another group of configurable units;
   updating the configuration file to remove the one or more interconnect paths include one or more rerouted interconnect paths; and
   displaying, in the GUI, one or more updated graphical objects representing the one or more rerouted interconnect paths.

26. The non-transitory computer readable storage medium of claim 25, the method further comprising:
   animating a movement of the third graphical object toward the location of the fourth graphical object;
   animating the rerouting of the one or more interconnect paths.

27. A computer-implemented method for editing a mapping of functions of a graph to configurable units of a reconfigurable data processor (RDP), the method comprising:
   obtaining a configuration file that maps a first function of a graph to a first configurable unit of an RDP;
   displaying a first graphical object representing the first configurable unit of the RDP and a second graphical object representing a second configurable unit of the RDP in a graphical user interface (GUI), positions of the first graphical object and the second graphical object in the GUI based on a relative physical position of the first configurable unit and the second configurable unit on an integrated circuit;
   detecting user input indicating a change in the mapping of the first function from the first configurable unit to the second configurable unit; and
   updating the configuration file to map the first function of the graph to the second configurable unit of the RDP.

28. The method of claim 27, further comprising:
   displaying, in the GUI, a third graphical object representing a first interconnect route, defined in the configuration file, between the first configurable unit and a third configurable unit of the RDP; and
   after the detecting of the user input:
      generating a second interconnect route between the second configurable unit and the third configurable unit;
      updating the configuration file to remove the first interconnect route and include the second interconnect route;
      removing the third graphical object from the GUI; and
      displaying a fourth graphical object representing the second interconnect route.

29. The method of claim 27, the GUI comprising a plurality of graphical objects, including the first graphical object and the second graphical object, the RDP comprising a plurality of configurable units, including the first configurable unit and the second configurable unit, and a plurality of links between pairs of configurable units of the plurality of configurable units, the plurality of graphical objects respectively representing one of one or more configurable units of the plurality of configurable units or one or more links of the plurality of links, the method further comprising:
   receiving an identifier of a particular element of the RDP, the particular element being a configurable unit of the plurality of configurable units or a particular link of the plurality of links;

displaying a list of operations in the GUI for particular element, the operations in the list of operations including one or more of:
  displaying information related to the particular element,
  highlighting a particular graphical object of the plurality of graphical objects representing the particular element, or
  editing a property of the particular element.

30. The method of claim 27, the GUI comprising a plurality of graphical objects, including the first graphical object and the second graphical object, the RDP comprising a plurality of configurable units, including the first configurable unit and the second configurable unit, and a plurality of links between pairs of configurable units of the plurality of configurable units, the plurality of graphical objects respectively representing one of one or more configurable units of the plurality of configurable units or one or more links of the plurality of links, the method further comprising:
  obtaining a plurality of functions for the graph from the configuration file, and an initial mapping of the plurality of functions to a first set of configurable units of the plurality of configurable units;
  obtaining an alternative mapping of the plurality of functions to a second set of configurable units of the plurality of configurable units, the second set of configurable units having at last one configurable unit not included in the first set of configurable units;
  calculating a cost of the alternative mapping; and
  presenting the cost of the alternative mapping along with a cost of the initial mapping in the GUI.

* * * * *